United States Patent
LeAnna

(10) Patent No.: US 11,896,096 B2
(45) Date of Patent: Feb. 13, 2024

(54) BALL JOINT BASE AND TWIST LOCK FOR SLIDEABLE CONCENTRIC MEMBERS ADAPTED FOR USE IN UMBRELLAS WITH EXTENSIBLE CANOPY RIBS

(71) Applicant: David L LeAnna, Thompsons Station, TN (US)

(72) Inventor: David L LeAnna, Thompsons Station, TN (US)

(73) Assignee: USEITT, LLC, Pinecrest, FL (US)

( * ) Notice: Subject to any disclaimer, the term of this patent is extended or adjusted under 35 U.S.C. 154(b) by 12 days.

(21) Appl. No.: 17/247,064

(22) Filed: Nov. 25, 2020

(65) Prior Publication Data

US 2021/0076790 A1    Mar. 18, 2021

Related U.S. Application Data

(63) Continuation-in-part of application No. 16/386,252, filed on Apr. 16, 2019, now abandoned.

(60) Provisional application No. 62/658,466, filed on Apr. 16, 2018.

(51) Int. Cl.
| | |
|---|---|
| A45B 19/04 | (2006.01) |
| A45B 25/08 | (2006.01) |
| F16M 11/14 | (2006.01) |
| A45B 17/00 | (2006.01) |

(52) U.S. Cl.
CPC ............. A45B 25/08 (2013.01); A45B 17/00 (2013.01); F16M 11/14 (2013.01)

(58) Field of Classification Search
CPC ......... A45B 19/04; A45B 19/06; A45B 19/10; A45B 2009/007
USPC ........................................................ 248/516
See application file for complete search history.

(56) References Cited

U.S. PATENT DOCUMENTS

| | | | | |
|---|---|---|---|---|
| 66,263 | A * | 7/1867 | Sutherland | A45B 19/04 135/26 |
| RE3,792 | E * | 1/1870 | Heermance | 8/94.29 |
| 840,241 | A * | 1/1907 | Nootbaar | F16C 11/106 248/515 |
| 2,997,264 | A * | 8/1961 | Zelenitz | A47G 33/1226 248/516 |
| 3,284,114 | A * | 11/1966 | McCord, Jr. | F16B 7/149 285/302 |
| 3,318,319 | A * | 5/1967 | Evans, Jr. | A45B 25/06 135/43 |
| 3,424,180 | A * | 1/1969 | Andolfi | A45B 25/02 135/30 |
| 3,568,963 | A * | 3/1971 | Koskinen | A45B 17/00 403/68 |
| 4,277,197 | A * | 7/1981 | Bingham | F16B 7/149 403/104 |
| 4,531,855 | A * | 7/1985 | Wallis | F16M 11/2078 403/90 |
| 4,974,802 | A * | 12/1990 | Hendren | F16M 11/14 403/90 |
| 6,352,228 | B1 * | 3/2002 | Buerklin | F16C 11/106 248/288.51 |

(Continued)

*Primary Examiner* — Noah Chandler Hawk
(74) *Attorney, Agent, or Firm* — Miller & Martin PLLC

(57) ABSTRACT

A twist lock mechanism for easily achieving a secure locking relationship between an outer member and an inner member is provided for use on an umbrella with a ball-joint based for adaptive orientation, and a spike receiving base or anchoring base mechanism.

13 Claims, 35 Drawing Sheets

(56) References Cited

U.S. PATENT DOCUMENTS

| | | | | |
|---|---|---|---|---|
| 6,520,192 B1* | 2/2003 | Lo | .......... | A45B 19/04 |
| | | | | 403/109.5 |
| 7,025,315 B2* | 4/2006 | Carnevali | .......... | F16M 11/2078 |
| | | | | 403/56 |
| 7,082,953 B2* | 8/2006 | Liu | .......... | A45B 25/08 |
| | | | | 135/38 |
| 7,229,054 B2* | 6/2007 | Hu | .......... | A47C 7/5066 |
| | | | | 248/188.1 |
| 8,579,537 B2* | 11/2013 | VanLandingham | ...... | B25G 1/04 |
| | | | | 16/427 |
| 8,820,336 B1* | 9/2014 | Schneberger | .......... | A45B 11/00 |
| | | | | 135/20.1 |
| 9,615,636 B2* | 4/2017 | Harrison | .......... | F16M 11/2078 |
| 9,644,385 B2* | 5/2017 | Ngu | .......... | E04H 12/2238 |
| 10,426,153 B2* | 10/2019 | Thomas | .......... | A01K 97/10 |
| 2003/0146355 A1* | 8/2003 | Burr | .......... | F16M 7/00 |
| | | | | 248/188.4 |
| 2005/0194027 A1* | 9/2005 | Ko | .......... | A45B 25/08 |
| | | | | 135/39 |
| 2006/0054772 A1* | 3/2006 | Priscott | .......... | A45B 11/00 |
| | | | | 248/518 |
| 2010/0230957 A1* | 9/2010 | Tsuda | .......... | F16L 19/083 |
| | | | | 285/330 |
| 2020/0069011 A1* | 3/2020 | LeAnna | .......... | A45B 25/22 |

* cited by examiner

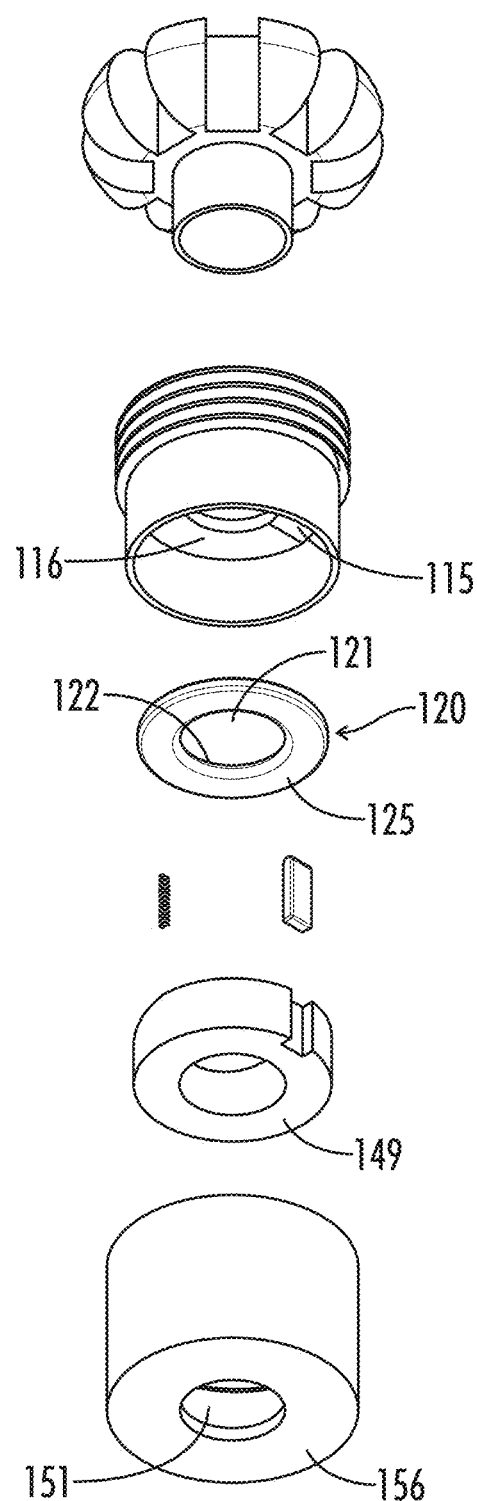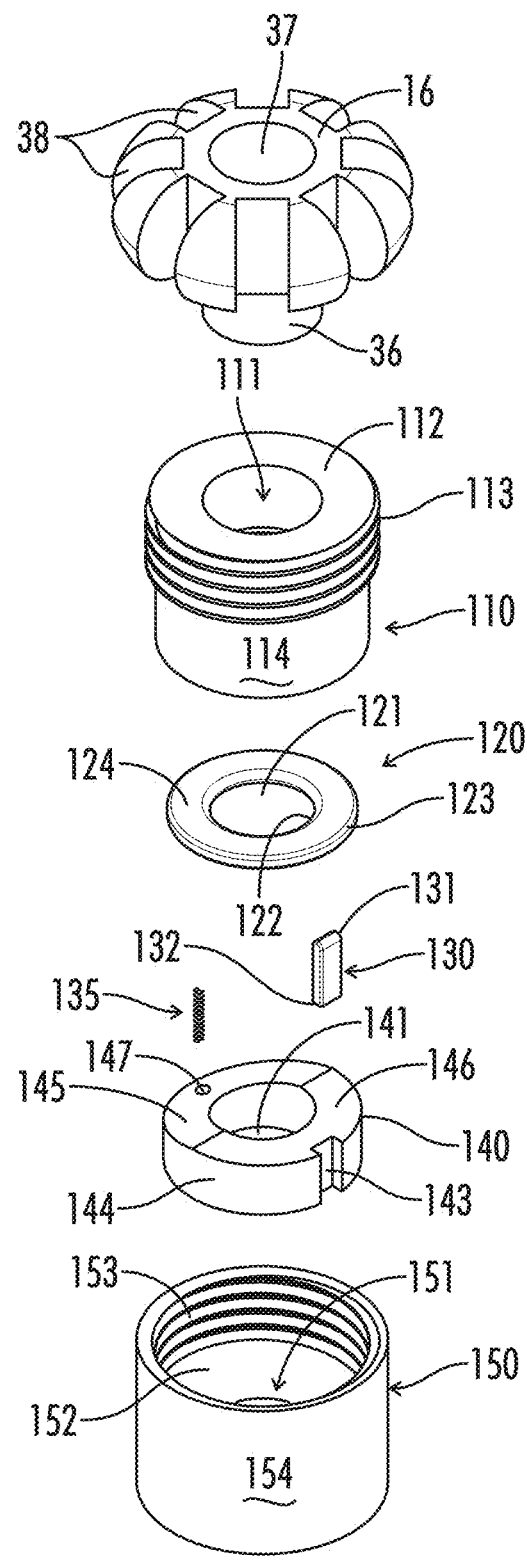
*FIG. 7A*  *FIG. 7B*

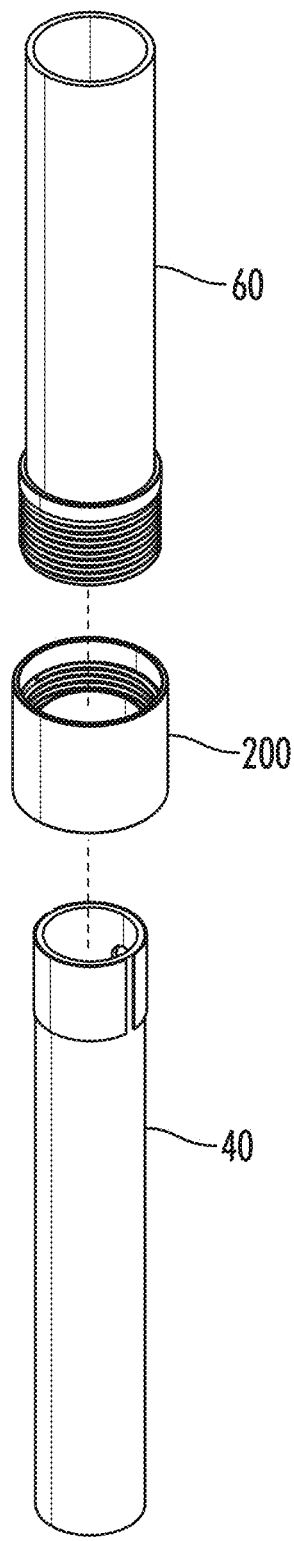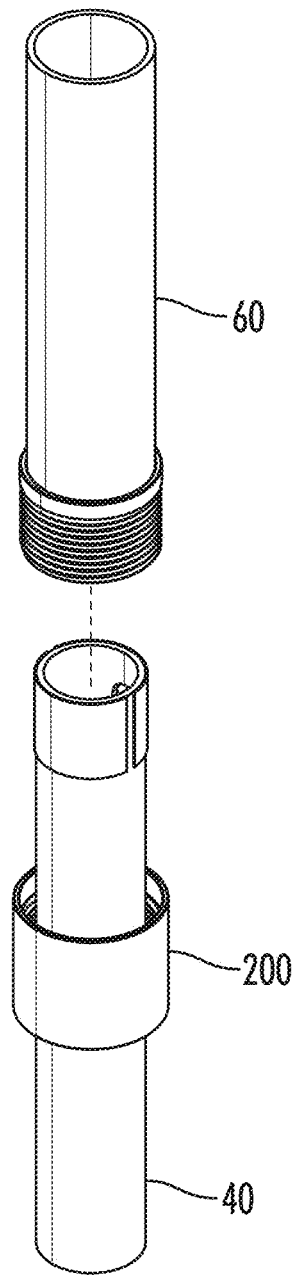
FIG. 21B
FIG. 21C

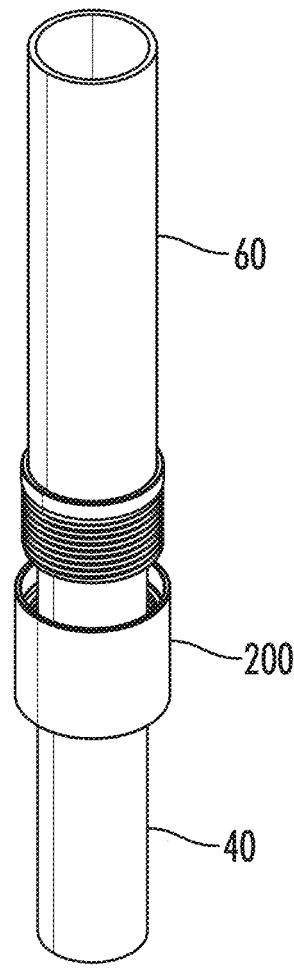 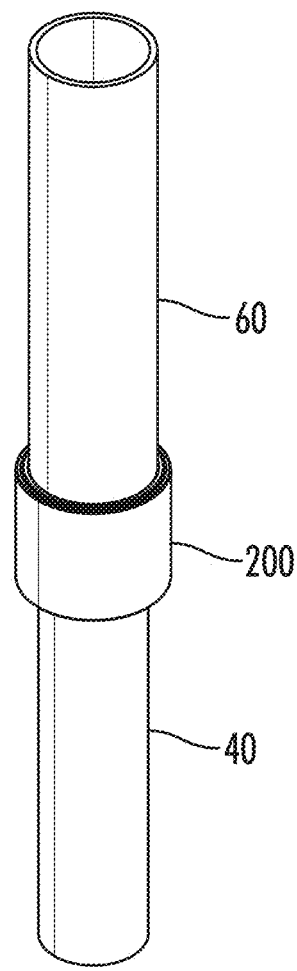
*FIG. 22A*  *FIG. 22B*

BALL JOINT BASE AND TWIST LOCK FOR SLIDEABLE CONCENTRIC MEMBERS ADAPTED FOR USE IN UMBRELLAS WITH EXTENSIBLE CANOPY RIBS

The present application is a continuation in part of U.S. Ser. No. 16/386,252, filed Apr. 16, 2019 which in turn claims priority to U.S. Provisional Application Ser. No. 62/658,466, filed Apr. 16, 2018.

FIELD OF THE INVENTION

The present invention relates to ball joint base combined with various base mounting options, twist locking slideably disposed concentric members as often found in umbrellas both about the runner for an umbrella canopy and for telescoping concentric tubing, and extensible canopy ribs.

BACKGROUND OF THE INVENTION

Umbrellas are widely used to provide protection from the sun or the elements. Since umbrellas are nearly invariably used outside, it is desirable that the umbrella components provide stability when subjected to at least light winds and breezes, and even heavier weather when possible. It is also desirable that adjustments to umbrellas be subject to rapid implementation as that umbrellas can be opened and extended quickly when needed and collapsed and retracted when it is desired to strike the umbrella as to take it indoors. It can also be advantageous when these adjustments are continuously variable rather than only suited to fix the umbrella at discrete open and closed positions.

Four areas where umbrellas have been subject to either cumbersome or unstable adjustments lie in the mechanisms utilized between telescoping poles that adjust the length of the shaft of the umbrella, providing it with an adjustable height from its base or handle, the setting of the runner which raises the stretchers that engage ribs supporting the fabric canopy, the adjustment of the orientation of the umbrella, and the secure mounting of the umbrella on a variety of surfaces.

The present invention seeks to address the difficulties in providing effective adjustment mechanisms for pole length and canopy tension utilizing a bidirectional twist lock type mechanism, the use of a ball joint to adjust pole orientation, and novel base structures and anchors.

BRIEF SUMMARY OF THE INVENTION

Novel twist locking and unlocking mechanisms for concentric sliding members are provided to facilitate adjustment and convenience for umbrella users. A ball joint base is provided to allow for adjustable pole and canopy orientation. Base structures adapted for mounting on hard or soft surfaces are provided. These and other aspects of the improved locking mechanism, joint, and base for umbrella designs will become apparent in review of the drawings and detailed description of the invention.

BRIEF DESCRIPTION OF THE DRAWINGS

FIG. 7A is an exploded bottom perspective view of the components of the twist locking mechanism illustrated in FIGS. 4-6.

FIG. 7B is an exploded top perspective view of the components of the twist locking mechanism illustrated in FIGS. 4-6.

FIG. 21B is a partially exploded top perspective view of the twist lock of FIG. 21A showing assembly steps.

FIG. 21C is a partially exploded top perspective view of the twist lock of FIG. 21A showing additional assembly steps.

FIG. 22A is a partially exploded top perspective view of the twist lock of FIG. 21A showing further assembly steps.

FIG. 22B is a top perspective view of the assembled twist lock of FIG. 21A.

DETAILED DESCRIPTION OF THE DRAWINGS

Figure 1:
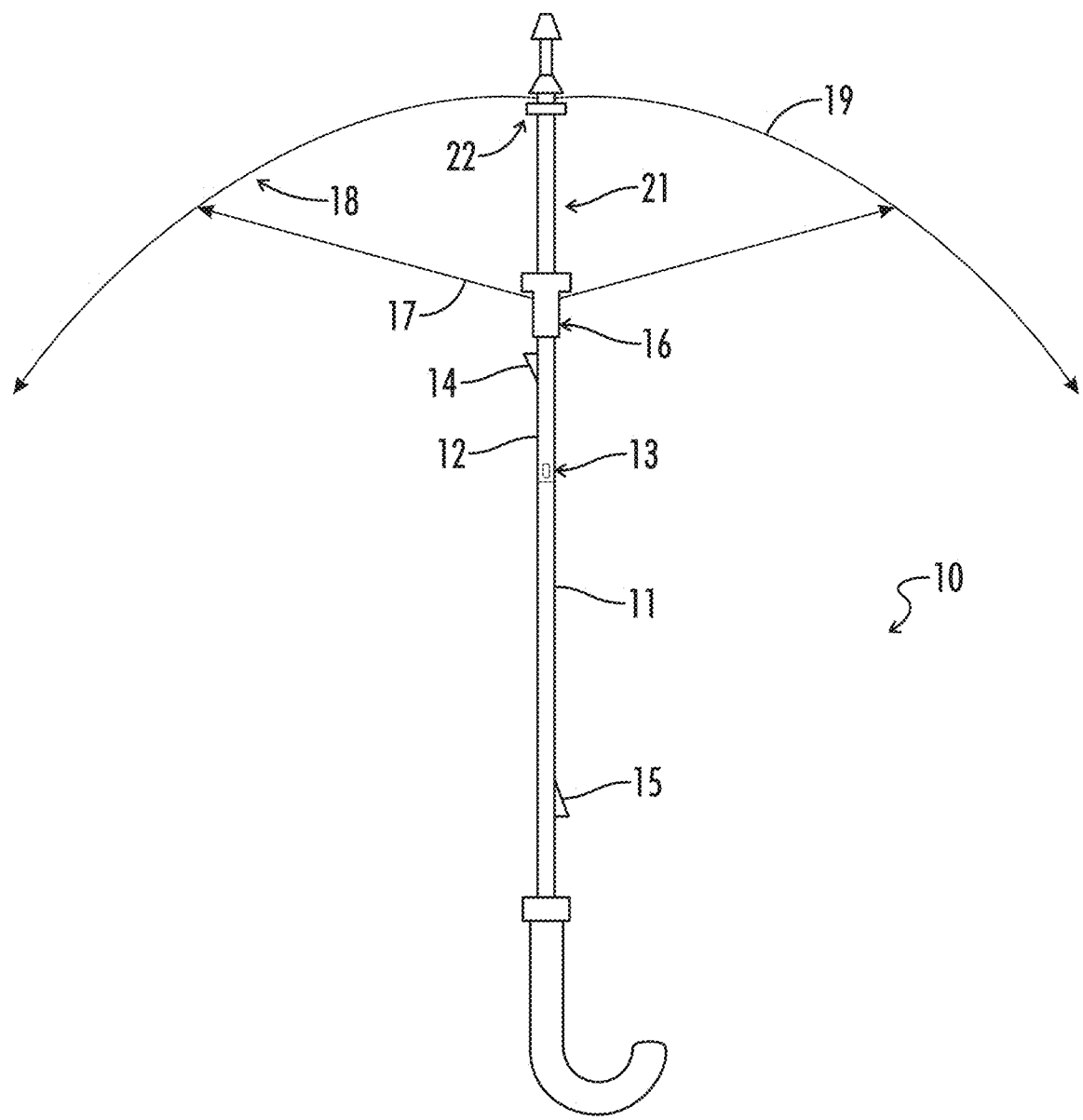
FIG. 1 is a side plan view of a prior art handheld umbrella.

Turning to FIG. 1, an exemplary handheld prior art umbrella 10 is shown with lower main shaft 11 and upper main shaft 12 which may be unitarily formed with top tube 21. Runner 16 encircles the top tube 21 and is longitudinally adjustable along the top tube 21 and shafts 11,12 between a lowered position (not shown) and a raised position in which the stretchers extend outward holding ribs 18 in the fabric canopy 19 outward to provide shelter. In a typical handheld umbrella, the runner 16 is positioned in its upward raised location by a spring located detent 14 which blocks the downward movement of the runner.

In addition, the handheld umbrellas can be made to store in compact closed form with a two-part pole that may be extended and locked with a ball spring 13. A bottom spring loaded detent 15 can be utilized when the center pole is collapsed and the runner is in its downward location to hold the umbrella in a locked closed position.

Figure 2A:
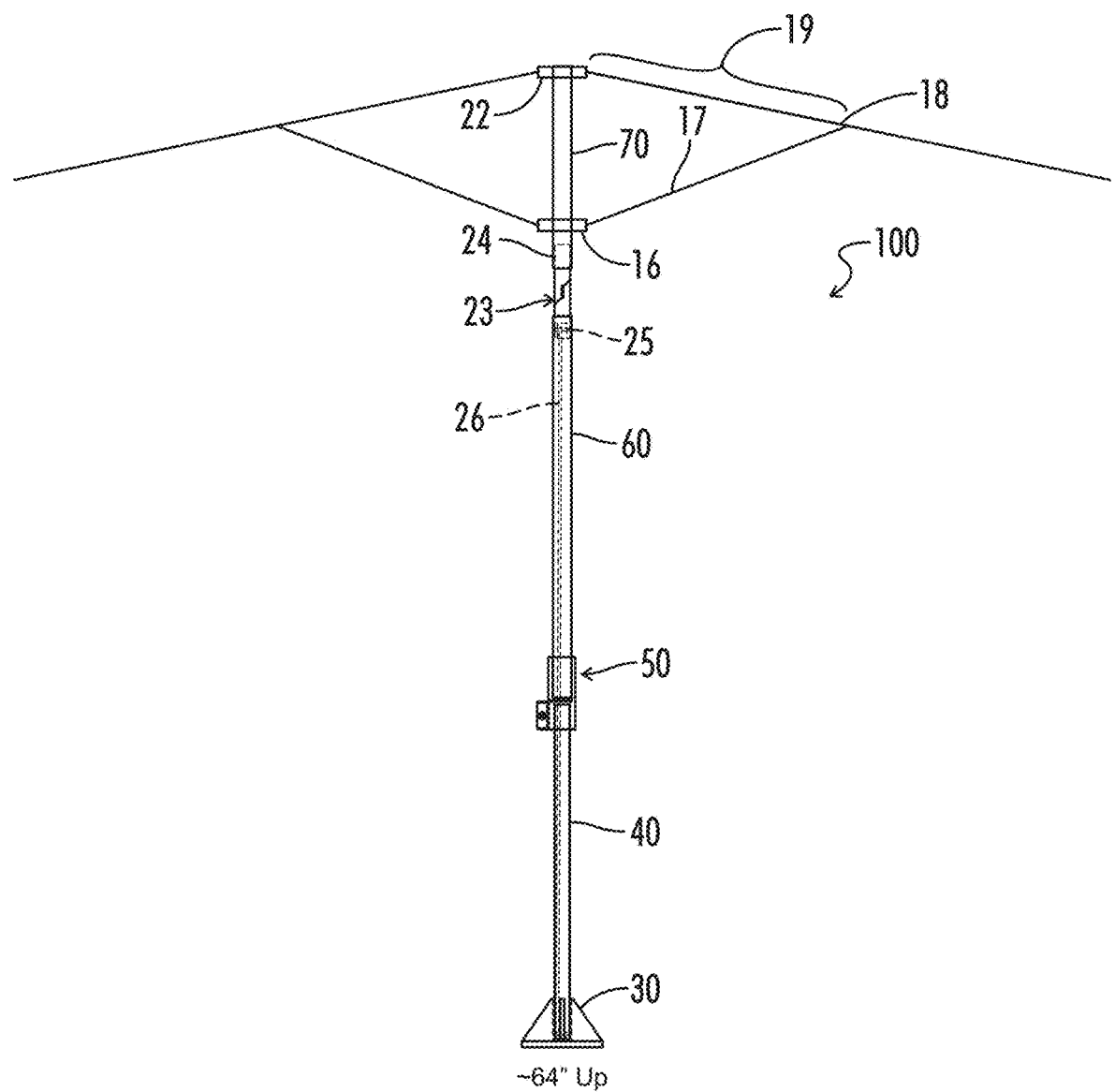
FIG. 2A is a side plan view of an exemplary fixed mount umbrella with clamping style lock for telescoping pole elements.

An alternative form of umbrella is a base mounted umbrella typical for use on patios and outdoor tables as shown in FIG. 2A. Such umbrellas are generally larger than hand held umbrellas, and instead of a base, some such umbrellas intended for beach use will have the bottom of the shaft driven into the sand. Larger outdoor umbrellas are often used for extended periods of time as they are suitably employed to provide shade in fair weather. Their weight and complexity of installation leads to these larger umbrellas often being left in place through good weather and some periods of wind and precipitation.

The mounted umbrella 100 includes lower pole 40, base 30, upper pole 60, clamp for telescoping adjustment 50, top plug 25 to which one end of connecting cord 26 is secured, the other end being secured at the base 30 or a base plug received in the bottom end of the lower pole 40. A hinge member 23 may be disposed between the upper pole 60 and top tube 70 to permit the canopy 19 to be tilted. A bottom portion of the hinge member 23 can be formed with the top plug 25. The canopy 19 is opened by the operation of ribs 18 that are anchored at top notched structure 22 and urged into an extended position by raising runner 16 with the result that stretchers 17 push the ribs 18 outward. In contrast to the spring-loaded detent 14 of FIG. 1, in this instance the raised runner 16 is held in position by a pin 24 that is inserted across the width of top tube 70 through pre-drilled openings. As reflected in FIG. 2A, the lower and upper base pole sections, 40, 60 may be joined utilizing a clamping mechanism. Frequently, a bayonet-style telescoping nut is used in such a structure, the telescoping nut is loosened from the bayonet fingers and the smaller of the pole sections is placed within the fingers extending from the larger pole section and then the nut is engaged to threads and the rotational torque converted into gripping pressure on the bayonet fingers to hold the poles, 40, 60 fixed in desired position relative to one another.

Figure 2B:
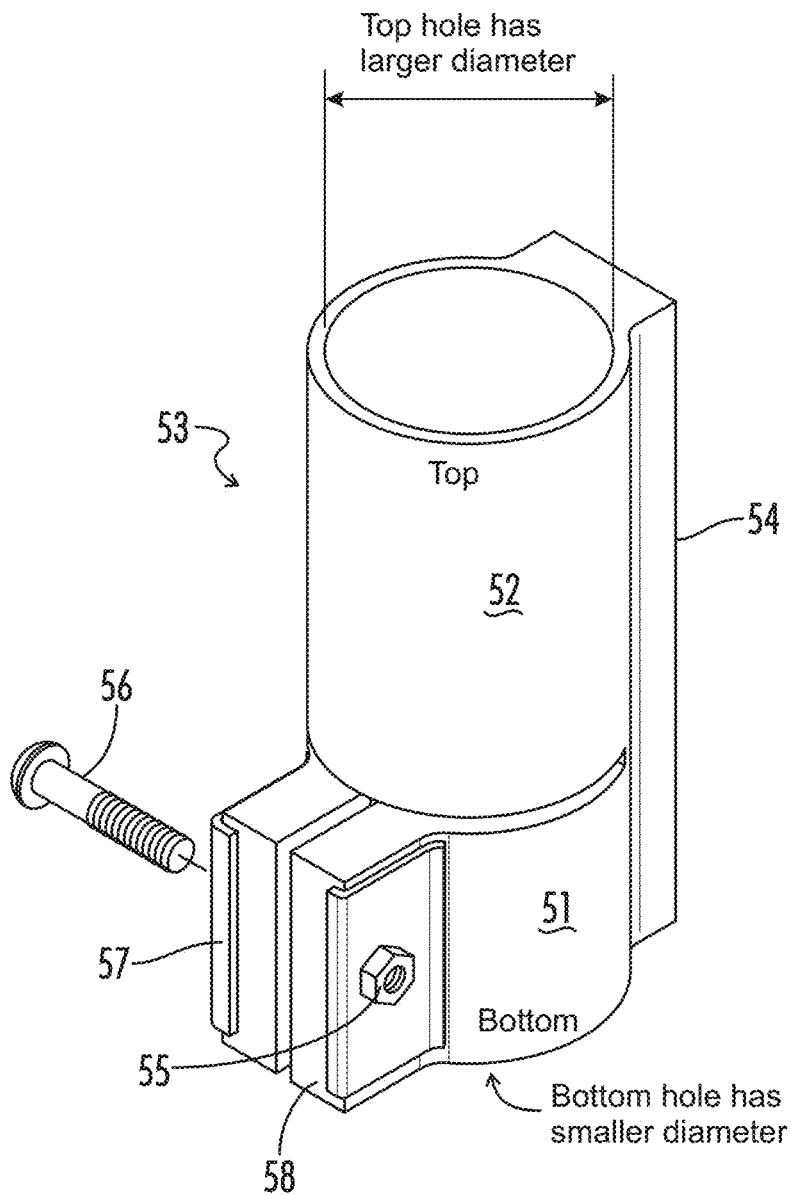
FIG. 2B is a perspective view of an exemplary clamping lock.

Unfortunately, such telescoping bayonet nut structure is not particularly durable in stiff breezes and one alternative has been to use a clamping system at the connection of upper pole 60 and lower pole 40. In the configuration illustrated in FIG. 2B, a clamping sleeve 53 is provided that is fixedly positioned to the upper pole 60 with the upper pole having a larger diameter than the lower pole 40. It is understood that the clamp could be inverted if the sizes of the poles were reversed. The top 52 of the clamping sleeve 53 is relatively larger than the bottom 51 to accommodate a larger upper pole 60 relative to the bottom opening to fit over the somewhat smaller bottom pole 40 having a slightly smaller diameter so that the bottom pole is sized to fit within the lumen of the upper pole 60. In this fashion, when the umbrella is closed from its open and extended position shown in FIG. 2A to a closed and retracted position, the lower clamp portion 51 can be loosened and the lower base pole 40, slid within the upper pole 60. Pictured elements include extending clamping elements 58 on the lower portion 51 that may be reinforced with metal plates 57 to maintain the effectiveness of the clamping sleeve under the force exerted by a stiff breeze. In addition, metal plate may be inserted in the bat connector 54 that holds the top 52 and bottom 51 portions of the clamping sleeve in position relative to one another. Pictured in FIG. 2B is a cap-head or hex screw 56 and nut 55, the nut preferably embedded in one clamping element 58. To facilitate rapid clamping and unclamping of the sleeve 53 without the need for additional tools it may be desirable to use a T-handled bolt and to fix a threaded portion or nut 55 within at least one side of the clamping elements 58 in the bottom clamping portion 51 of the clamping sleeve 53.

The use of a positioning pin 24 in FIG. 2A, suggests the pin should be attached by string or cord to minimize the risk of loss when the umbrella is adjusted or taken out of service overnight or in off season. Alternative structures might use an Allen wrench to tighten a fastening nut in place. The use of a band clamp becomes difficult in the top of an umbrella because the rotational or levered handle used for clamping may interfere with the stretchers 17 and ribs 18. The use of pins and wrenches is disfavored because the parts are not self-contained in the umbrella assembly. In addition, both pins with pre-drilled openings and spring-loaded detents are necessarily provided only at discrete locations. It is more desirable that an umbrella canopy be continuously adjustable so that the canopy can always be set at the desired tension. This not only allows for standard canopy opening and tension due to minor manufacturing discrepancies, but more importantly, it allows for adjustments as a canopy ages. When a fabric canopy has been in substantial outdoor use, the fabric tends to stretch and develop untensioned areas between the ribs. These areas of the canopy may droop unattractively and may make undesirable flapping noise in low winds.

Pins and detents provide only discrete positioning at predetermined locations. In fact, using a spring-loaded detent at more than one location for raised position is relatively inefficient. If a pin fastener is used, then there must be a series of pre-formed openings and adjustment will only be possible in the discrete increments between the height of those openings.

Figure 3:
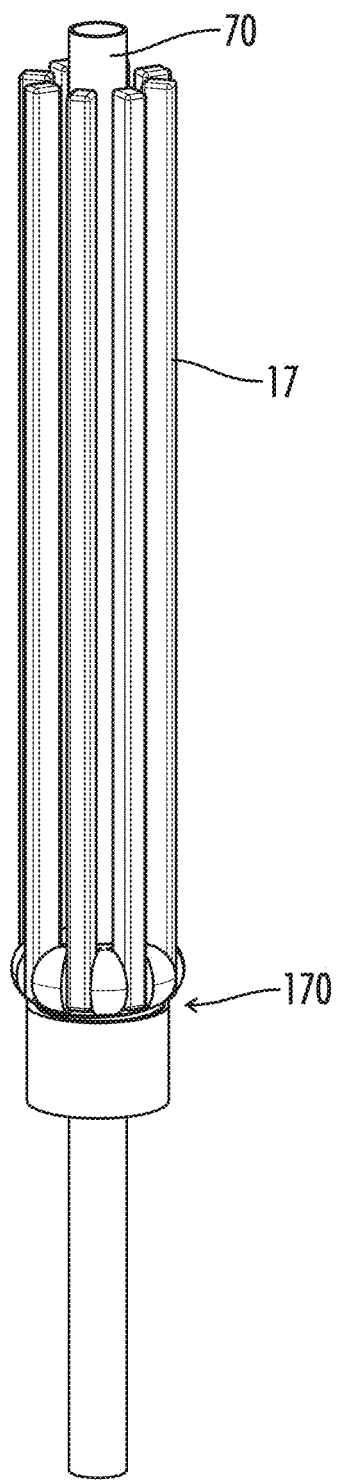
FIG. 3 is a perspective view of the stretcher and top tube assembly for an umbrella encompassing a twist lock according to one embodiment of the invention.
Figure 8:
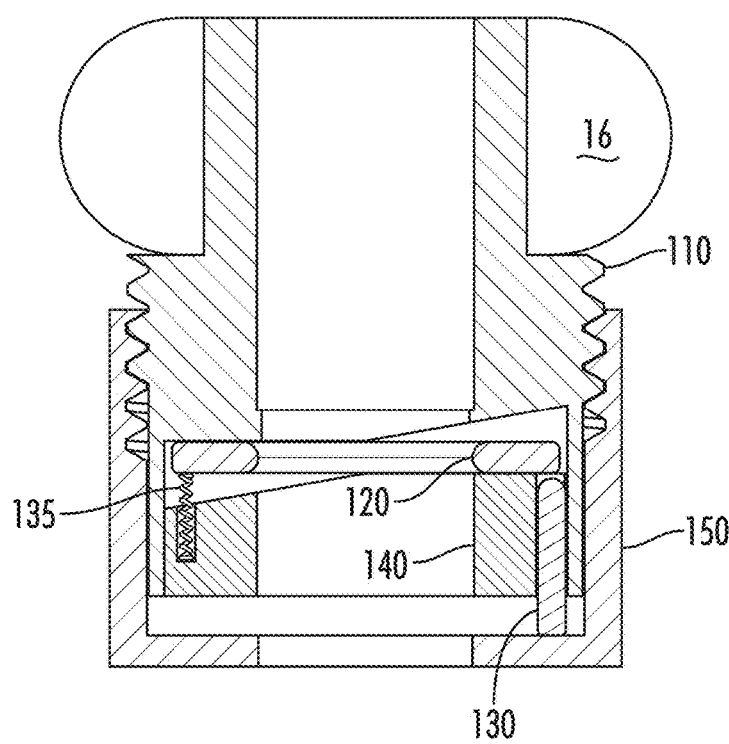
FIG. 8 is a sectional view of a modified twist locking mechanism in unlocked position.
Figure 10:
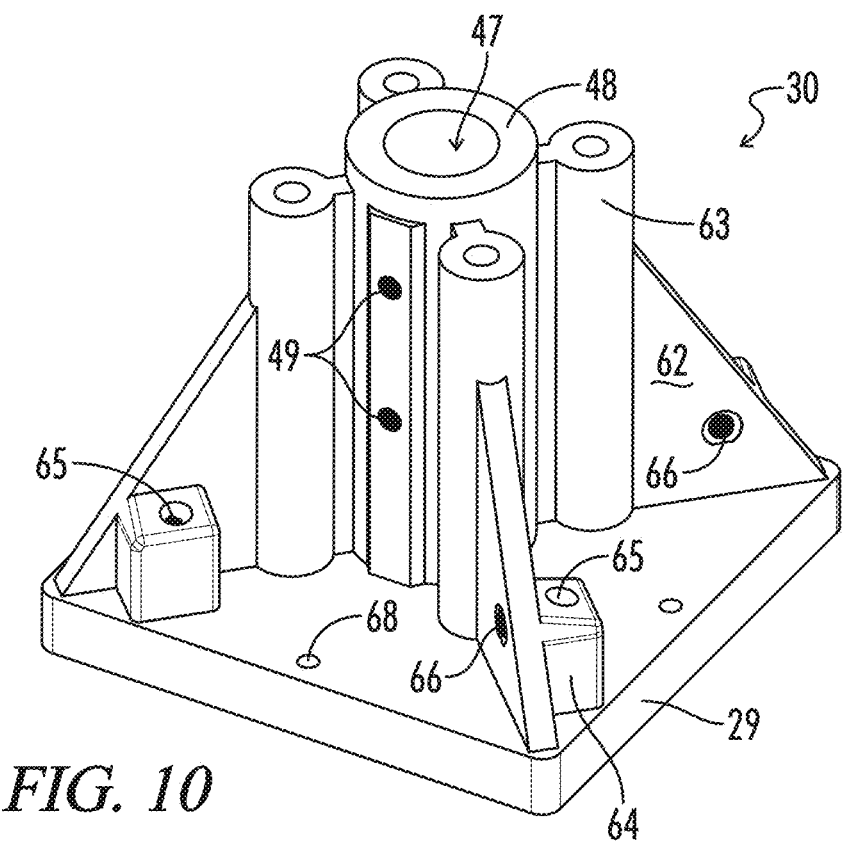
FIG. 10 is a top perspective view of an improved base design with extended longitudinal openings for spike anchors.
Figure 11:
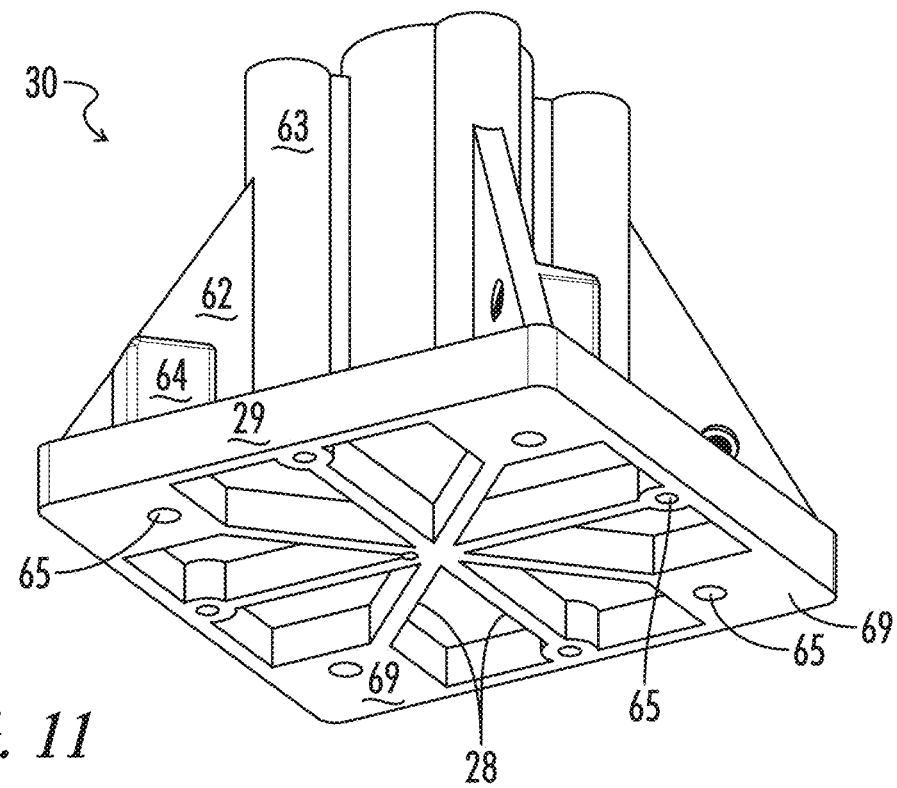
FIG. 11 is a bottom perspective view of the base of FIG. 10.

Turning then to FIG. 3, an exemplary use for a twist lock is illustrated with the first outer concentric member comprising lock 170 shown on a top tube 70 for an umbrella, the outer member including the function of the runners 16 from FIGS. 1 and 2 to urge the base ends of stretchers 17 upward to affect the outward movement of ribs 18 supporting the umbrella canopy. It will be understood that stretchers and ribs may be made of many materials such as wood, plastic, and composites. The illustrated castellated gaps 38 as shown in detail in FIGS. 7,8, and 10, are typical for wooden stretchers or more commonly resin stretchers that are often colored to a neutral or wood-like tone.

FIGS. 4 through 8 illustrate a first embodiment of a twist locking mechanism 170 suitable for use in an umbrella. Components include the runner 16 that has a central lumen 37 to receive an umbrella top pole 70 as the second interior member and peripheral channels 38 in which bottom ends of stretchers 17 can be pivotably mounted. A lower cylindrical section 36 of runner 16 can be press fit or glued into the opening 111 of cap 110. Cap 110 is the upper confining element for lock ring 120 that has a central opening only slightly larger than the outer diameter of top pole 70. On the interior of cap 110 is a downward facing surface 116 that is generally parallel to the top 112 of the cap 110 normal to the axis of the interior lumen 111 that receives top pole 70. However, one side of this downward facing surface is angled upward to produce inclined surface 115, the upper surface 124 of lock ring 120 rests against these interior surfaces 116, 115, depending on its angular orientation. The interior edge 122 of lock ring 120 may optimally have a radius nearly equal to its thickness and the upper surface 124 extends across from the interior edge 122 to the exterior edge 123. As shown in FIG. 7, lock ring 120 also has a bottom surface 125 between the interior and exterior edges 122,123. A typical lock ring 120 for use in a large umbrella may have a thickness of $3/16^{th}$ inches, and the radius of the interior edge 122 is also about $3/16$ths.

Figure 5:
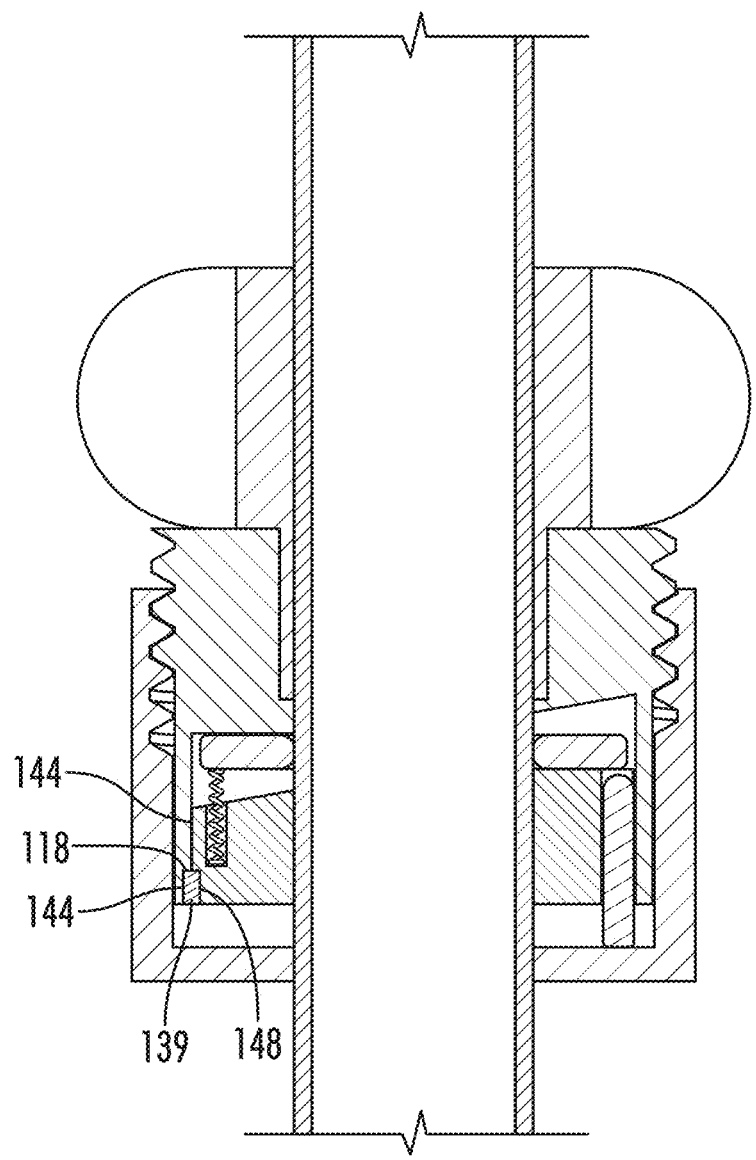
FIG. 5 is a side sectional view of the locking mechanism of FIG. 4 with the umbrella top tube in place in unlocked configuration.

The base support 140 is received within the downward extending flange 114 of cap 110. The exterior surface 144 of base support 140 can be glued, bonded, or held in fixed position as by locking pin 139 between first notch 118 on the flange 114 and second notch 148 on the base support 140 as illustrated in FIG. 5. The upper surface of base support 140 includes a downward angled section 145 and a normal planar surface 146 that is generally parallel to the interior surface 116 within cap 110 and normal to the axis of the top tube 70 that extends through the lumen 141. Opening 147 is provided to hold a biasing element, such as coil spring 135, and notch 143 provides a path for the upward and downward movement of push rod 130 with upper face 131 and bottom 132.

Finally, the bottom cap 150 has a central opening 151 with a bottom 152 and outer shell 154. The interior of bottom cap 150 is threaded 153 to mate with threads 113 on top cap 110. It can be seen in FIG. 4 that when the threads 113 of top cap 110, and threads 153 of bottom cap 150 are engaged but not tightened, there is space between the bottom 149 of base support 140 and the top of 152 of the interior flange of the bottom cap so that push rod 130 does not protrude above the top normal planar surface 146 of the base support 140. Instead, the lock ring 120 is held in a position normal to the axis of top tube 70 by upward bias from spring 135 on a portion of its bottom surface 125. When the lock ring 120 is biased to this position, normal to the axis of top tube 70, the tube 70 slides freely longitudinally within the lumens 111, 121,141,151 of the encompassing components of the twist lock mechanism 170.

Figure 6:
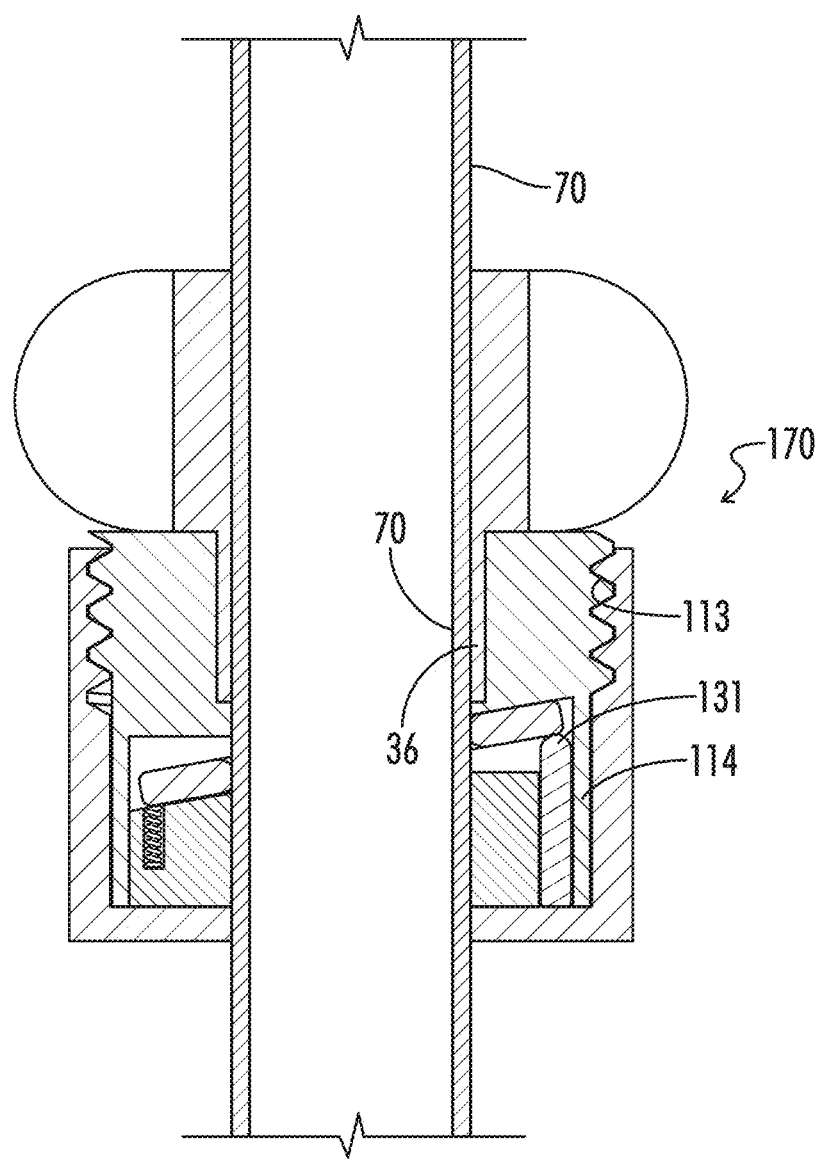
FIG. 6 is a side sectional view of the twist lock of FIG. 5 in locked configuration.

As shown in FIG. 6, as the bottom cap 150 and top cap 110 are twisted and tightened into a closed engagement, the interior bottom 152 of bottom cap 150 pushes upward on the bottom 132 of push rod 130 such that the top 131 of push rod 130 pushes on one bottom side 125 of lock ring 120 with sufficient force to overcome the biasing pressure of spring 135 resulting in moving the lock ring 120 into angled alignment against inclined surface 115. Generally, the inclined or angled interior surfaces will be between about 10° to 25° from normal to the axis of the lumens, and preferably about 15° from normal.

Figure 9:
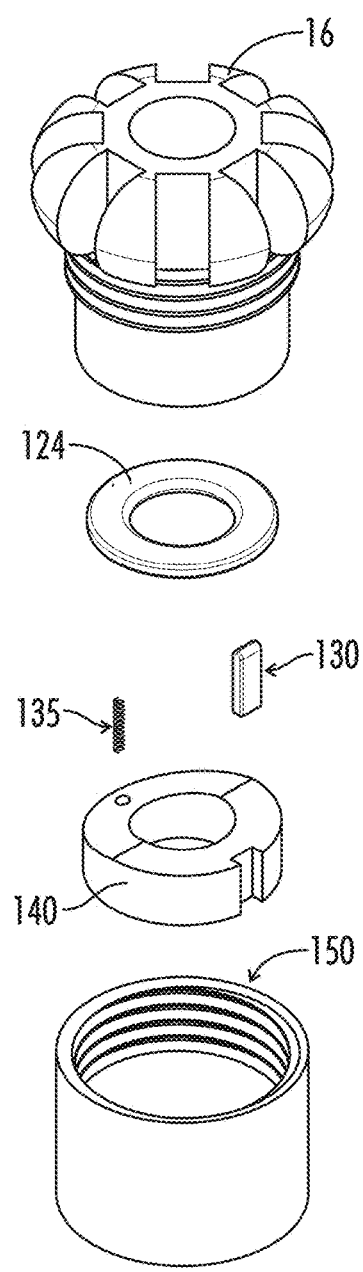
FIG. 9 is an exploded top perspective view of the components of the twist lock mechanism of FIG. 8.

In FIG. 6, it can be seen that in tightened position, the interior edge 122 of lock ring 120 moves into engagement on each side of the exterior of top tube 70. This engagement effects a locking action so that the twist lock 170 (and runner) is fixed relative to this position on top tube 70. In the illustrated embodiment, the interior base 152 of base cap 150 acts not only to urge the bottom 132 of push rod of 130 upward, but also confines push rod 130 in its position when the top cap 110 and bottom cap 150 are loosened to permit longitudinal sliding of the twist lock assembly. Details of the construction of the components are more readily viewed in exploded illustrations of FIGS. 7A and 7B. FIGS. 8 and 9 illustrate an alternative construction in which the runner 16 and top cap 110 are formed as in integral molding thereby facilitating the manufacture of the components by eliminating a joining step in the assembly process.

The same twist lock mechanism can be adapted for use between the lower pole 40 and upper pole 60 of conventional umbrellas in place of clamping mechanisms 50 as shown in FIG. 2A. Typical prior art clamps use a lever or fastener to tighten a compression band, while other telescoping umbrella poles use a twist fastener to compress fingers about the interior member. In the adjustment between upper and lower poles, the upper cap 110 is generally fixed to the base of the upper pole section 60 which has a larger diameter to act as a first outer member so that the lower pole section 40 or second member can be received within the upper pole section 60. The interior lumen elements of a twist lock adapted to this use are sized to receive the exterior of lower pole section 40. Screwing the lower cap section 150 into tight engagement with the upper cap section 110 will force the lock ring 120 into angled engagement with the lower pole 40 fixing its position relative to the twist lock mechanism on the lower end of upper pole 60.

It will be understood that if a larger diameter lower pole is used to receive a smaller diameter of upper poles, the twist lock mechanism could be positioned on the end of the larger lower pole serving as the first outer member to a similar result. Two additional important variables are the threading on the top cap 110 and bottom cap 150, and the shape of the poles and lumens. The pitch of the threads 113, 153 determines the amount of twist that is required between the top cap 110 and bottom cap 150. The larger the threads, the less twist is required, but there is also some loss of tension due to increased pitch torque. Generally, there will be between 4 and 28 threads per inch. Also, the lumen cross section is often round, but rectangular cross sections provide some advantages. When a lock ring 120 has a rectangular opening 121 that is tilted into engagement with opposite sides of a rectangular interior member, the entire bottom and top interior edges of the lock ring are engaged against the member. This provides a greater area of engagement than with circular lumens and members. In addition, rectangular, or square members are incapable of rotating relative to one another.

Figure 4:
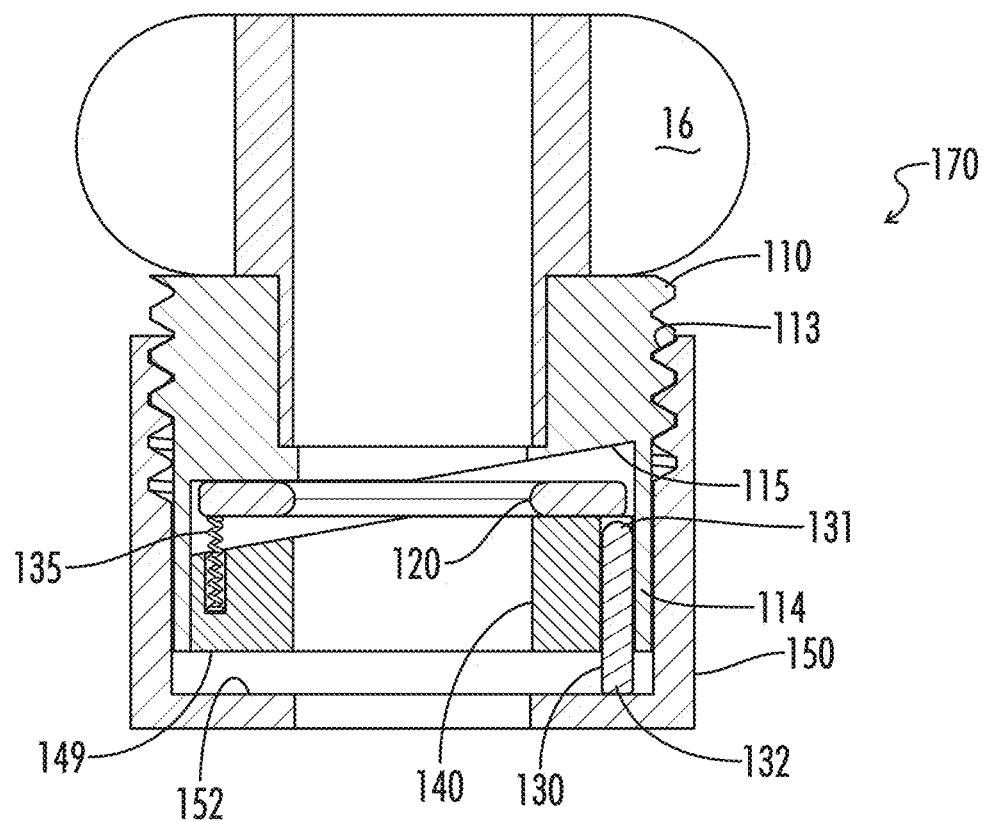
FIG. 4 is a side sectional view of a twist lock mechanism suitable for use with the stretcher assembly on the top tube of an umbrella shown with the tube removed.

Thus, a novel twist lock of the present invention allows the continuously variable positioning of a first member relative to a second interior member, with no extraneous parts. Furthermore, unlike many prior art twist lock assemblies, in the event of some slippage where an interior member rotates relative to the exterior twist lock, the rotation does not cause any loosening of the pressure asserted by the lock ring. In many prior art twist locks, a partial rotation of the elements relative to one another will also begin to loosen to lock and allow additional movement as can be seen in FIG. 4 of U.S. Pat. No. 4,086,718.

Figure 24:
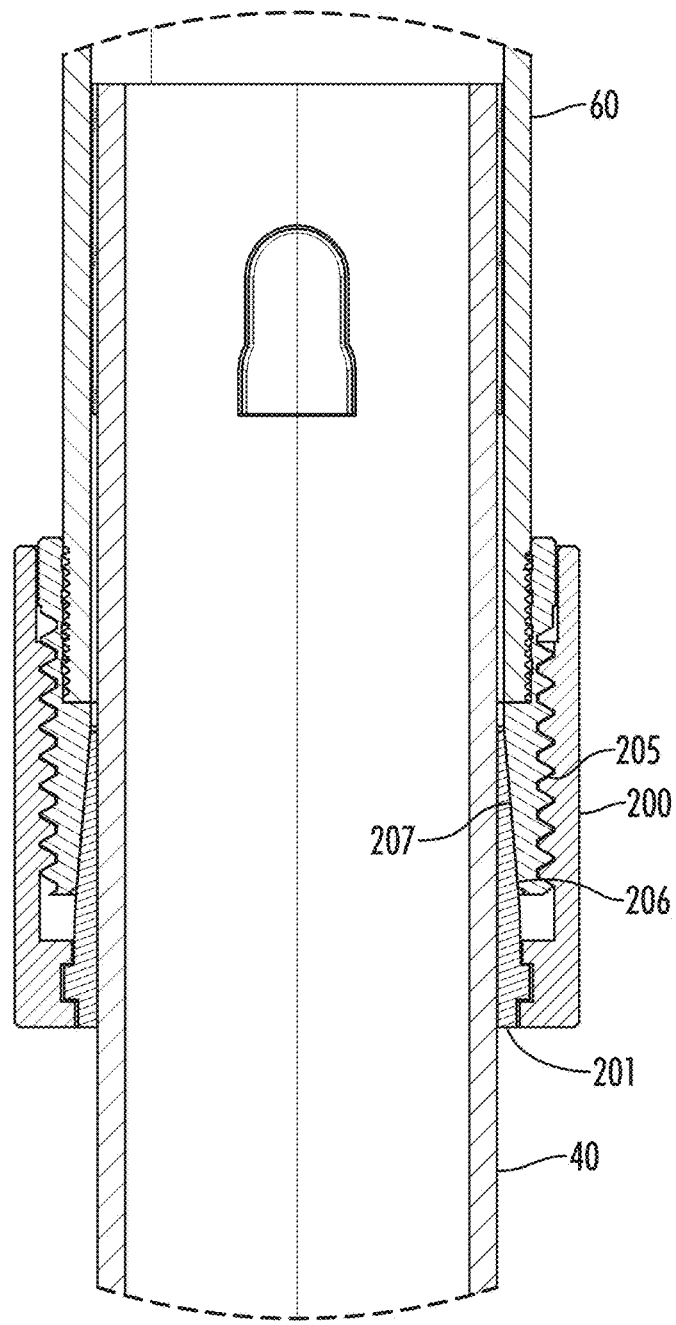
FIG. 24 is an enlarged sectional elevation view of a twist lock on concentric tubular members taken from the circled area of FIG. 23A.
Figure 25:
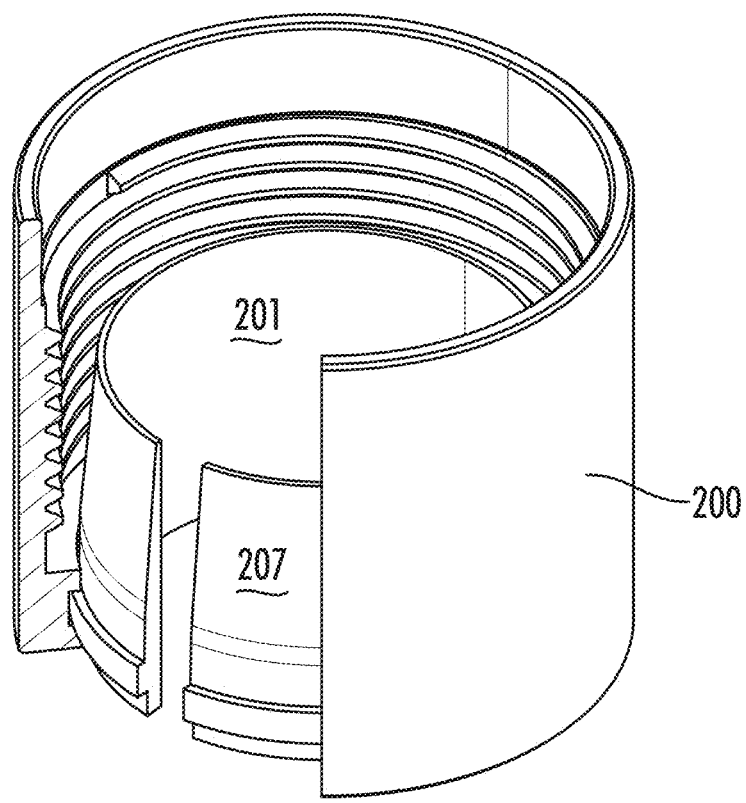
FIG. 25 is a partial sectional perspective view of a cover and split wedge collar assembly used in a twist lock on concentric tubular members.
Figures 26A, 26B:
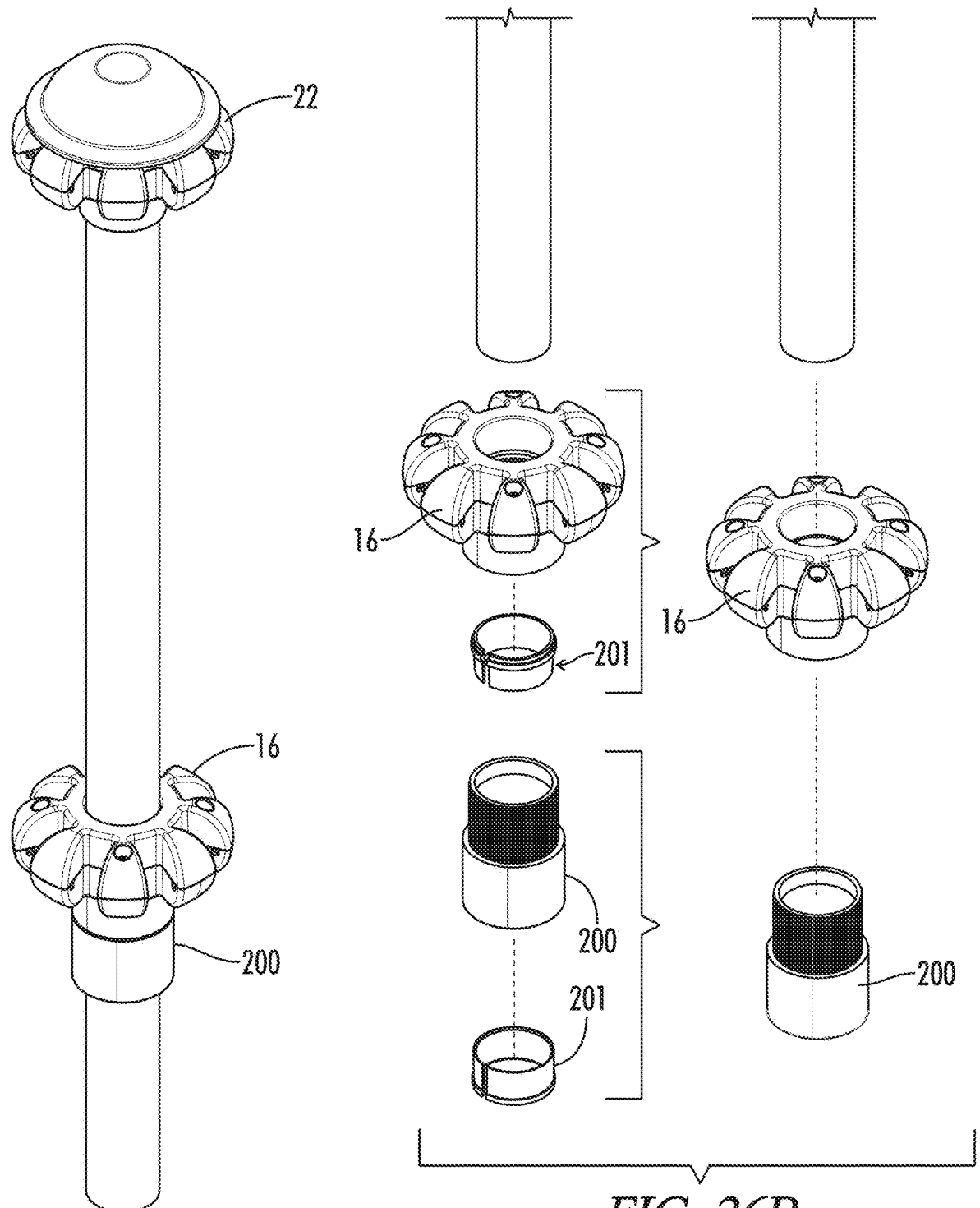
FIG. 26A is a perspective view of an exemplary umbrella pole with two twist lock assemblies.
FIG. 26B is an exploded top perspective view of the umbrella pole and twist locks of FIG. 26A.
Figures 27A, 27B:
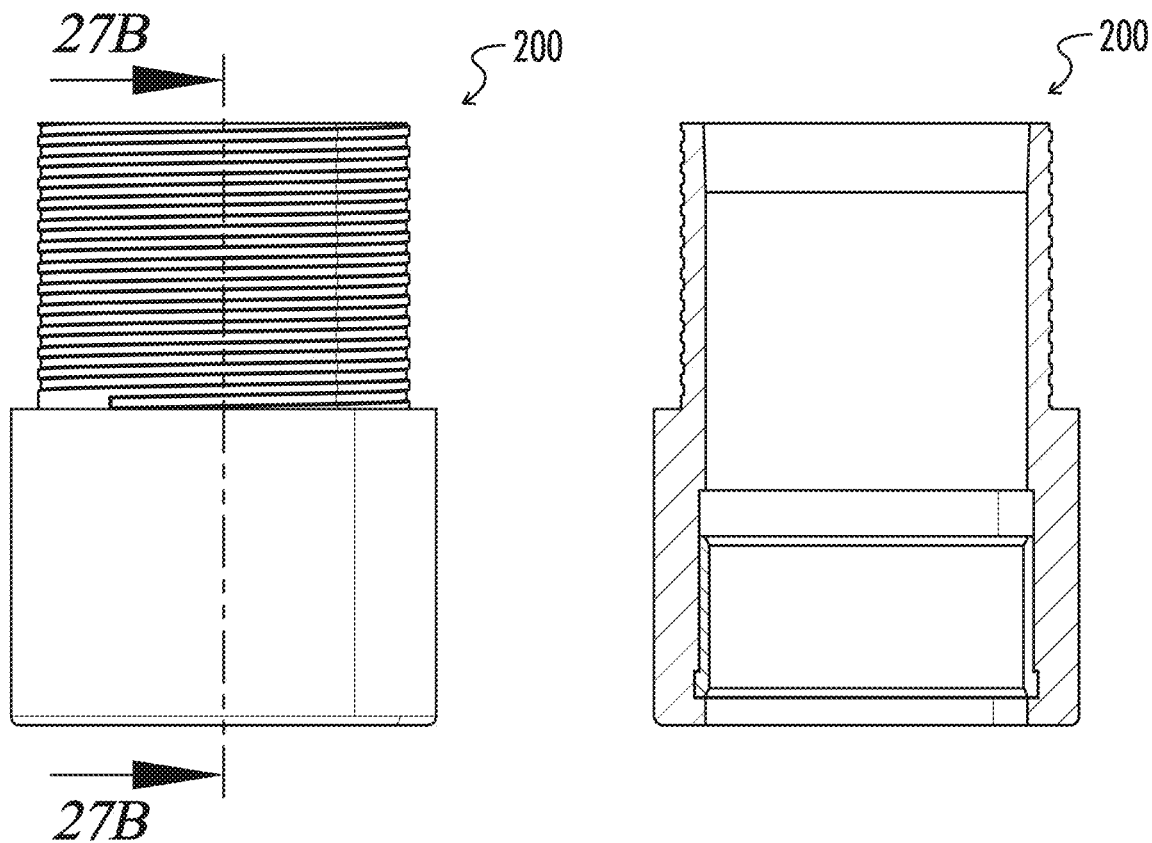
FIG. 27A is an elevation view of a lower twist lock housing from FIG. 26.
FIG. 27B is a sectional view of the housing of FIG. 27A taken along line A-A.
Figure 28A:
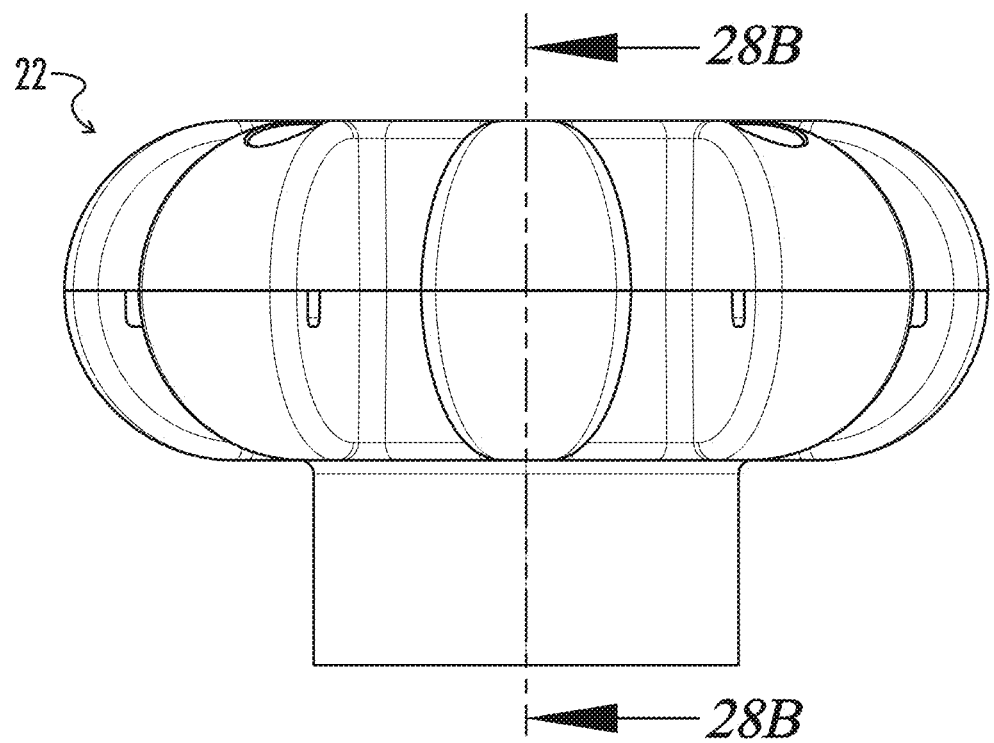
FIG. 28A is a side elevation view of an upper notched hub on the upper twist lock of the umbrella pole of FIG. 26A.
Figure 28B:
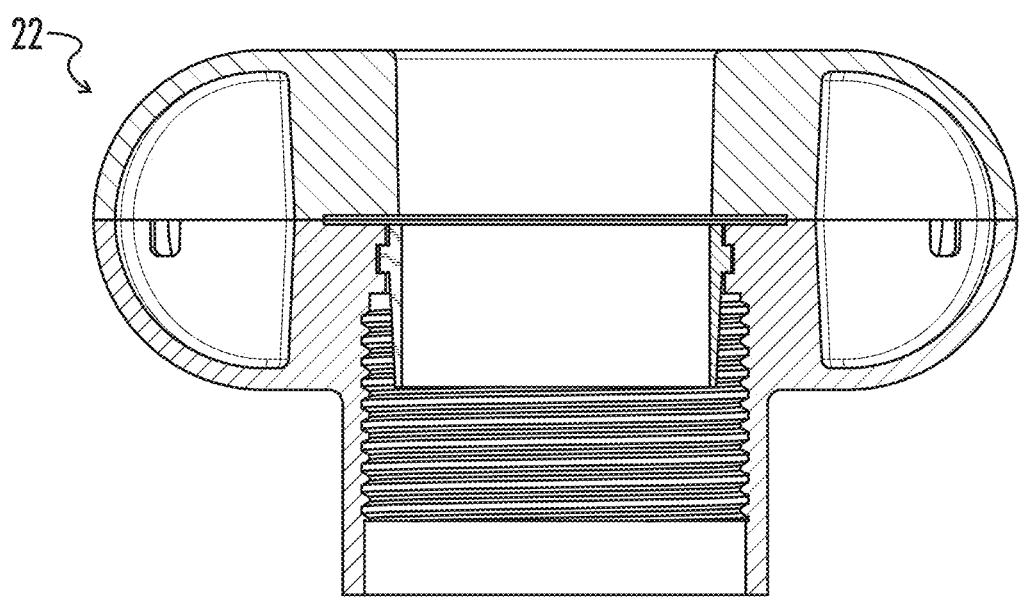
FIG. 28B is a sectional view of the upper notched hub of FIG. 28A taken along line B-B.
Figure 29:
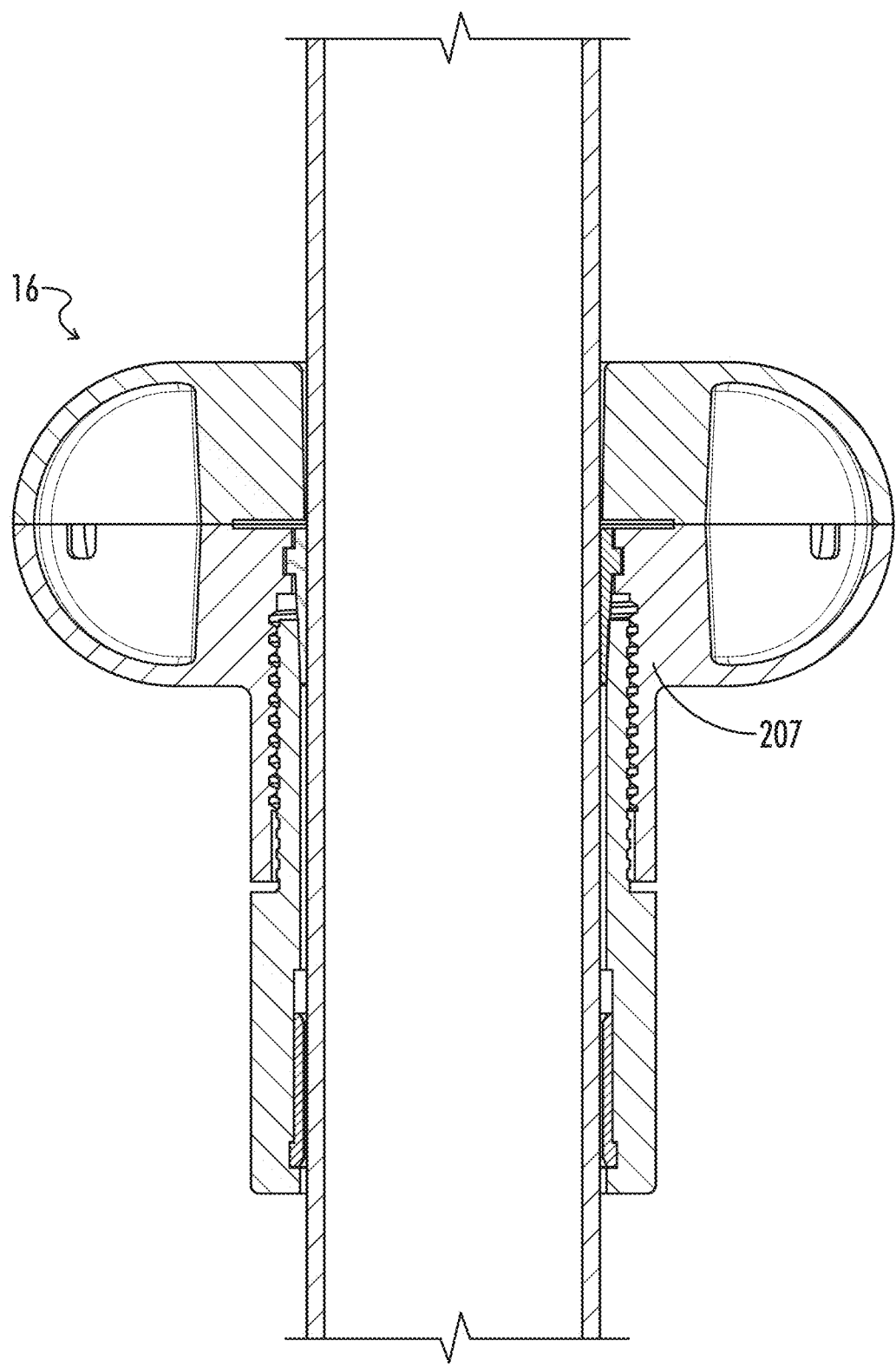
FIG. 29 is a sectional view of the twist lock associated with the runner on the umbrella pole of FIG. 26A.

Alternative twist lock assemblies are shown in FIGS. 21-29. These assemblies generally include an outer housing 200, with an inner fitting split wedge collar 201 that is spaced inward to receive the threaded shim 203 that is affixed to the bottom of the top pole 60. The threaded shim 203 as illustrated is screwed on to lower threads 60b of upper pole 60 and then outer threads 205 engage inner threads of the housing 200 pushing an interior angled surface 206 over the wedge collar surface 207 and securely frictionally engaging the wedge collar between pole and shim 203 as shown in FIG. 24. Twist lock mechanisms can be deployed both between upper and lower poles and between runner and upper pole. Advantageously, a twist lock mechanism is not limited in placement be the positions of detents or pin holes, but can provide continuous adjustability over the life of an umbrella, which may prove desirable as canopies droop over time.

FIG. 10 illustrates a fixed base pole mounting solution in the form of base 30. Base 30 is comprised of a bottom 29 that rests upon a surface and may advantageously have significant material removed and be provided only with reinforcing ribs 28 to provide adequate strength and rigidity. Upward standing from the bottom 29 is a cylindrical portion 48 defining an interior lumen 47 to receive the lower pole 40. Cylindrical wall openings 49 allow for the use of securing pins that may extend through the cylindrical wall 48 and corresponding openings in lower pole wall 43 near its lower pole bottom 44. Cylindrical wall 48 is advantageously supported by fins 62 which may be further reinforced by cylindrical sections 63 to provide added rigidity. Of particular interest are the spike blocks 64 which have substantially vertical lumens 65 proceeding from tops of spike blocks 64 through to reinforced corner bottom 69 and that allow for the passage of mounting spikes or nails. Opening 66 in the back of spike blocks 64 allow the use of set screws to hold spikes in substantially fixed position within the lumens 65. Lumens 65 are often round, but shapes can be varied to accommodate different spike configurations. In practice hexagonal spikes provide good spike strength and anchoring, but may be loosened by a twist so that they and the umbrella assembly can be removed for transport.

Figure 12A:
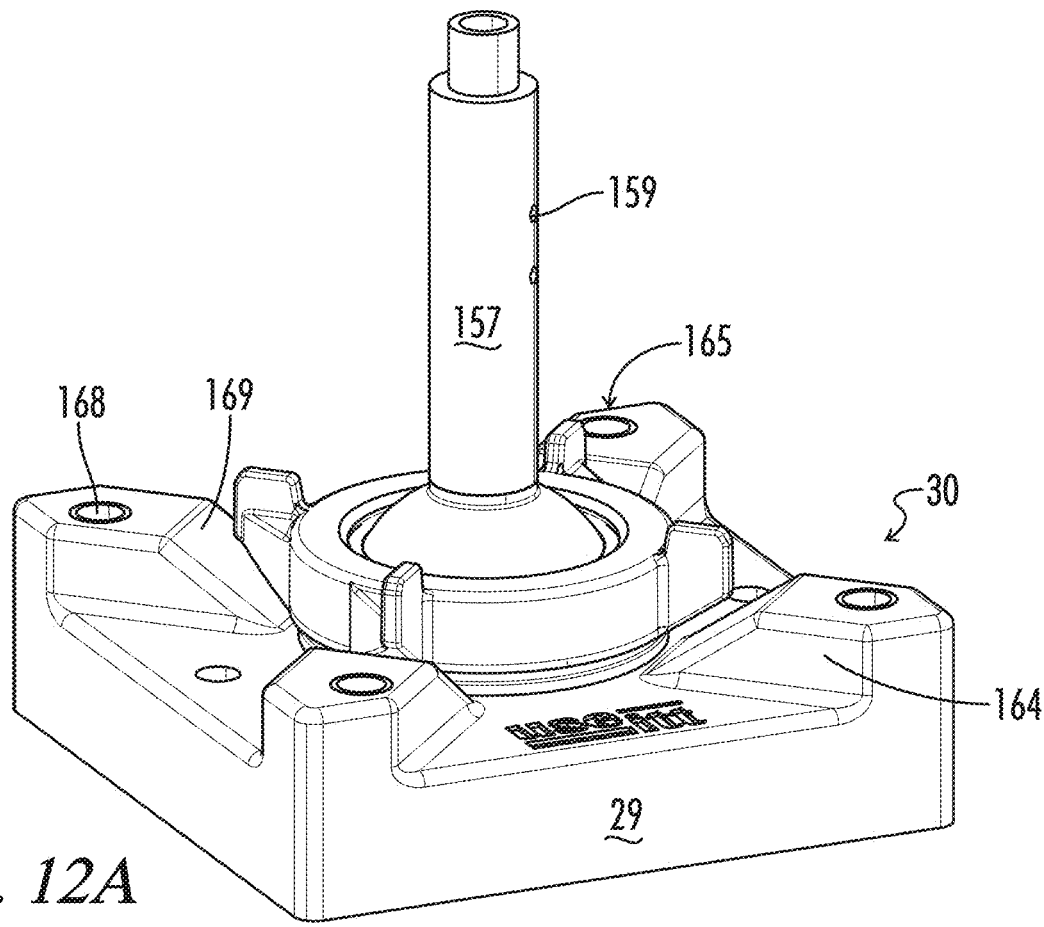
FIG. 12A is a top perspective view of a base with ball joint adjustment mechanism.
Figure 12B:
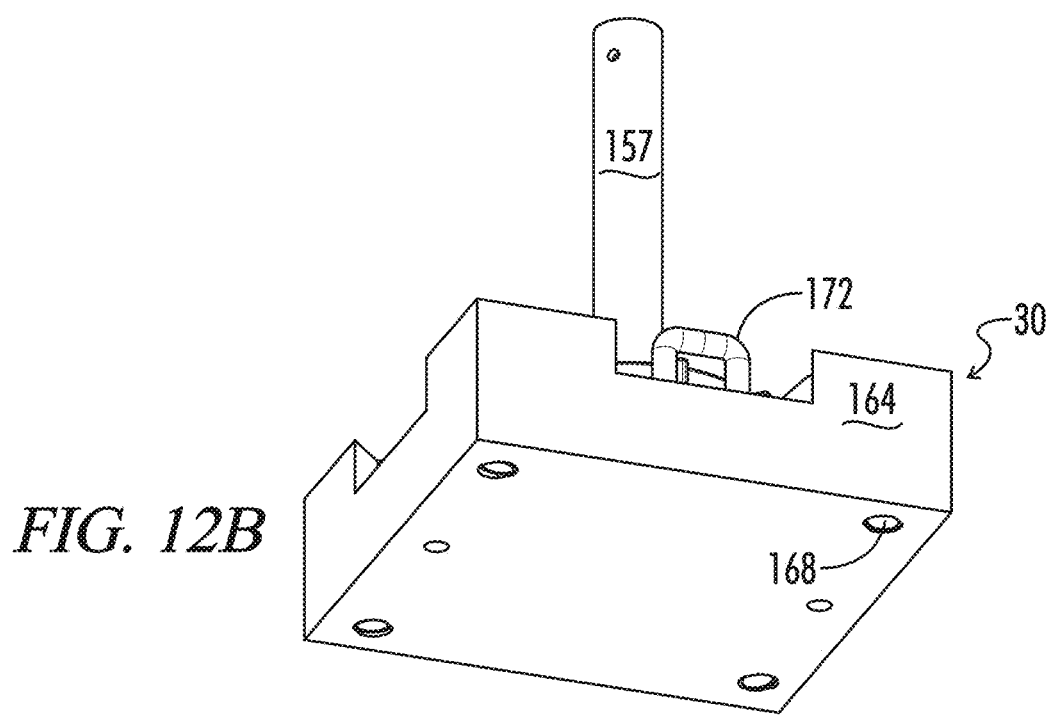
FIG. 12B is a bottom perspective view of an alternative base with ball joint adjustment mechanism.
Figure 13A:
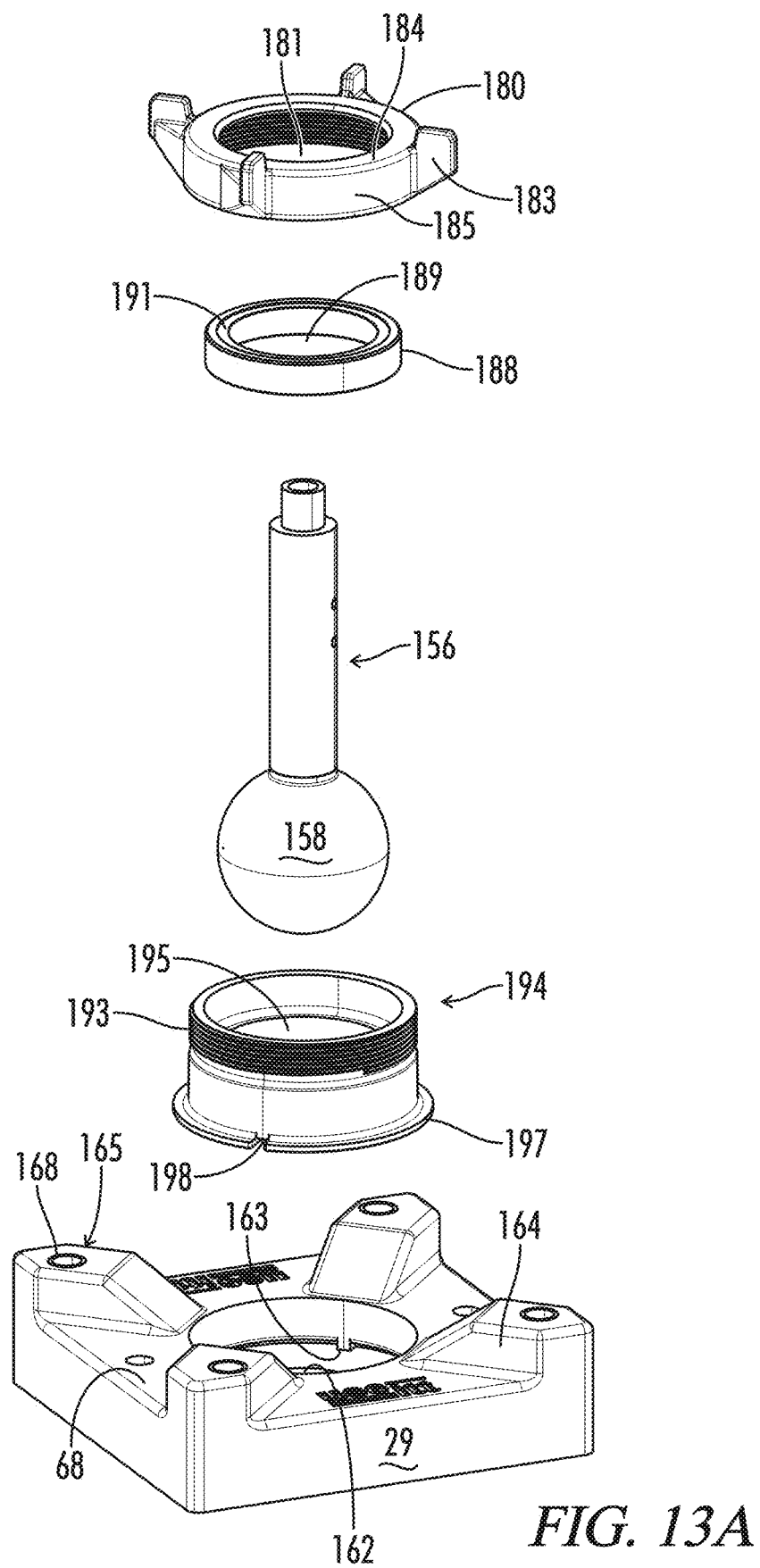
FIG. 13A is a top perspective exploded view of the components of the base of FIG. 12A.
Figure 13B:
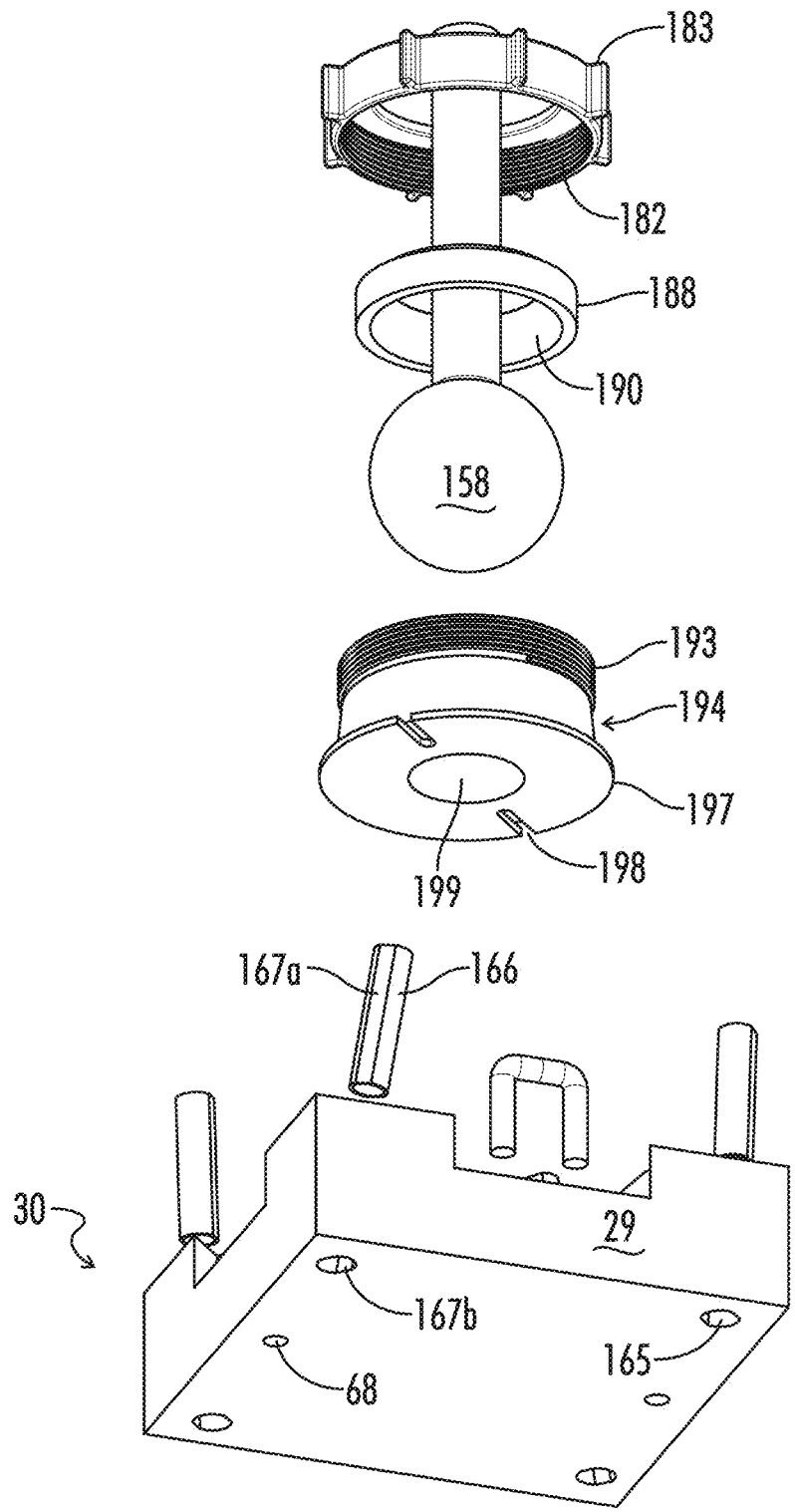
FIG. 13B is a bottom perspective exploded view of the components of the base of FIG. 12B.

FIGS. 12 through 15 illustrate an alternative base design, including a ball joint. Turning first to FIGS. 12 and 13, an alternative base 30 is shown with enhanced mounting and ball joint adjustment capabilities. For mounting purposes, the base 30 has raised corner blocks 164 that are elevated from the general bottom portion 29 of base 30 and ramps 169 slope upward from the center to the corner blocks 164. Between opposite pairs of corner blocks 164 in FIGS. 12B and 13B are openings 173 to receive posts of U-shaped strap connectors 172 that can be utilized to hold the base 30 in place with mounting straps as known in the art.

Figure 20:
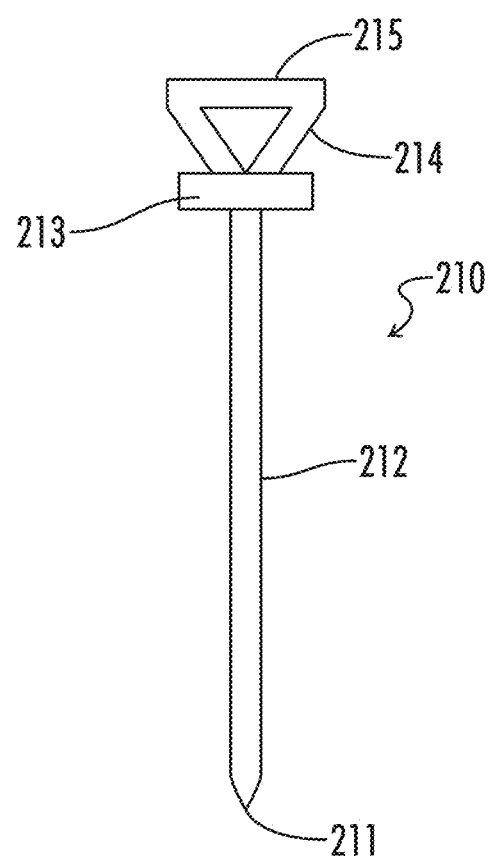
FIG. 20 is a plan view of an exemplary sand stake for use in connection with a base, preferably of the type shown in FIGS. 10 and 11.
Figure 21A:
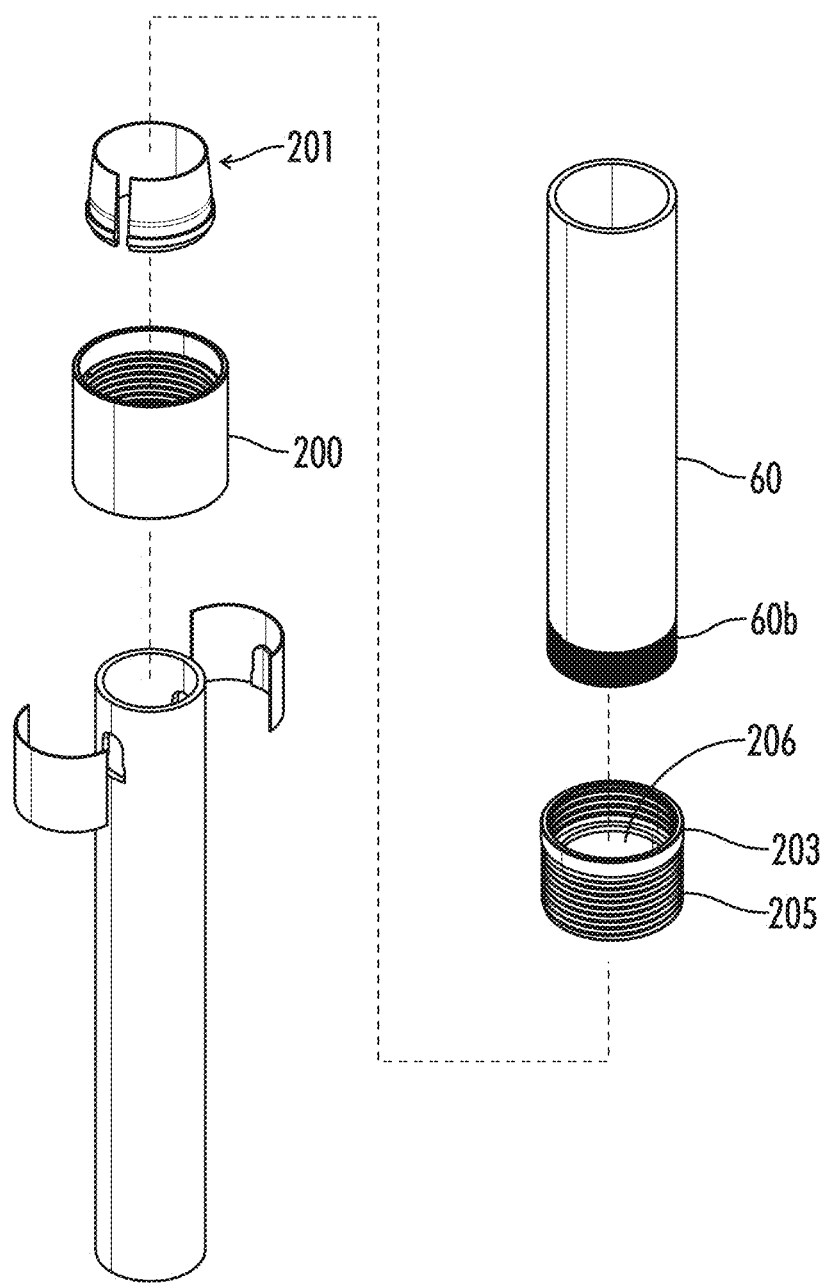
FIG. 21A is an exploded top perspective view of a twist lock with internal collar wedge for use on concentric tubular members.
Figure 23B:
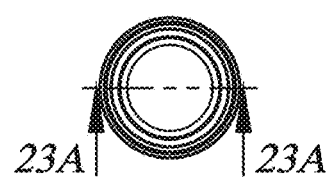
FIG. 23B is a top plan view of concentric tubular members with a twist lock and including sectional line 23A-23A.
Figure 23A:
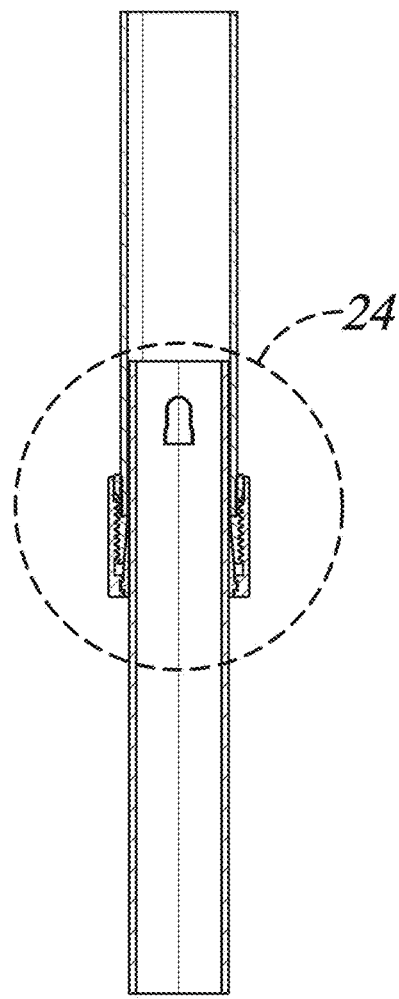
FIG. 23A is a sectional elevation of a twist lock on concentric tubular members taken along line 23A-23A of FIG. 23B, with a circled area designated for enlargement.

The corner blocks 164 are provided with substantial height so that openings 165 formed in the base 30 have lengths between about 1.0 and 2.5 inches. Within the openings 165 are opposed flat and preferably parallels sides 167b. Received in openings 165 are sleeves 166 that have preferably parallel opposed planar sides 167a. Sleeves 166 have interior lumen 168 extending there through. Accordingly, it can be seen that when sleeves 166 are mounted in corner block openings 165 the interface of planar surfaces 167a, 167b prevents sleeve rotation. The length of the sleeves serves to stabilize close fitting spikes passing through their openings. Optimally, the base 30 can be formed of a plastic material and the sleeves 166 of a metallic or more durable material, and in this fashion, mounting spikes such as depicted in FIG. 20 may be securely placed through the openings 168 in the sleeves 166 and there will be little to no degradation of a tight and precise fit between the mounting spikes and the opening 168. Maintaining a precise fit is important to prevent increasing wobble or shake in the stand over time. Base 30 also has conventional openings 68 that pass through its bottom portion that may be used for nail, bolt, or screw attachments.

Figure 14A:
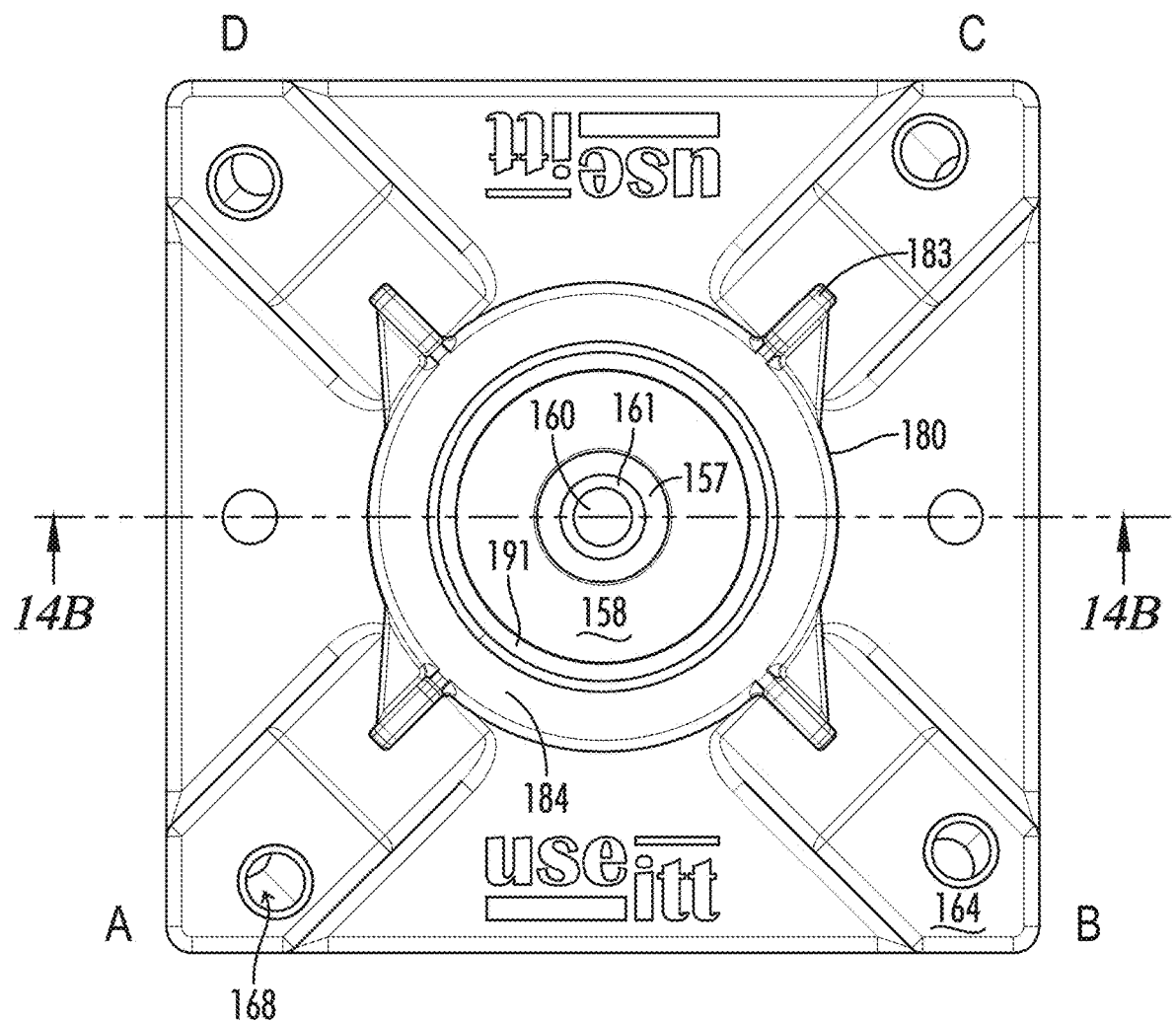
FIG. 14A is a top plan view of the base of FIG. 12A.
Figure 14B:
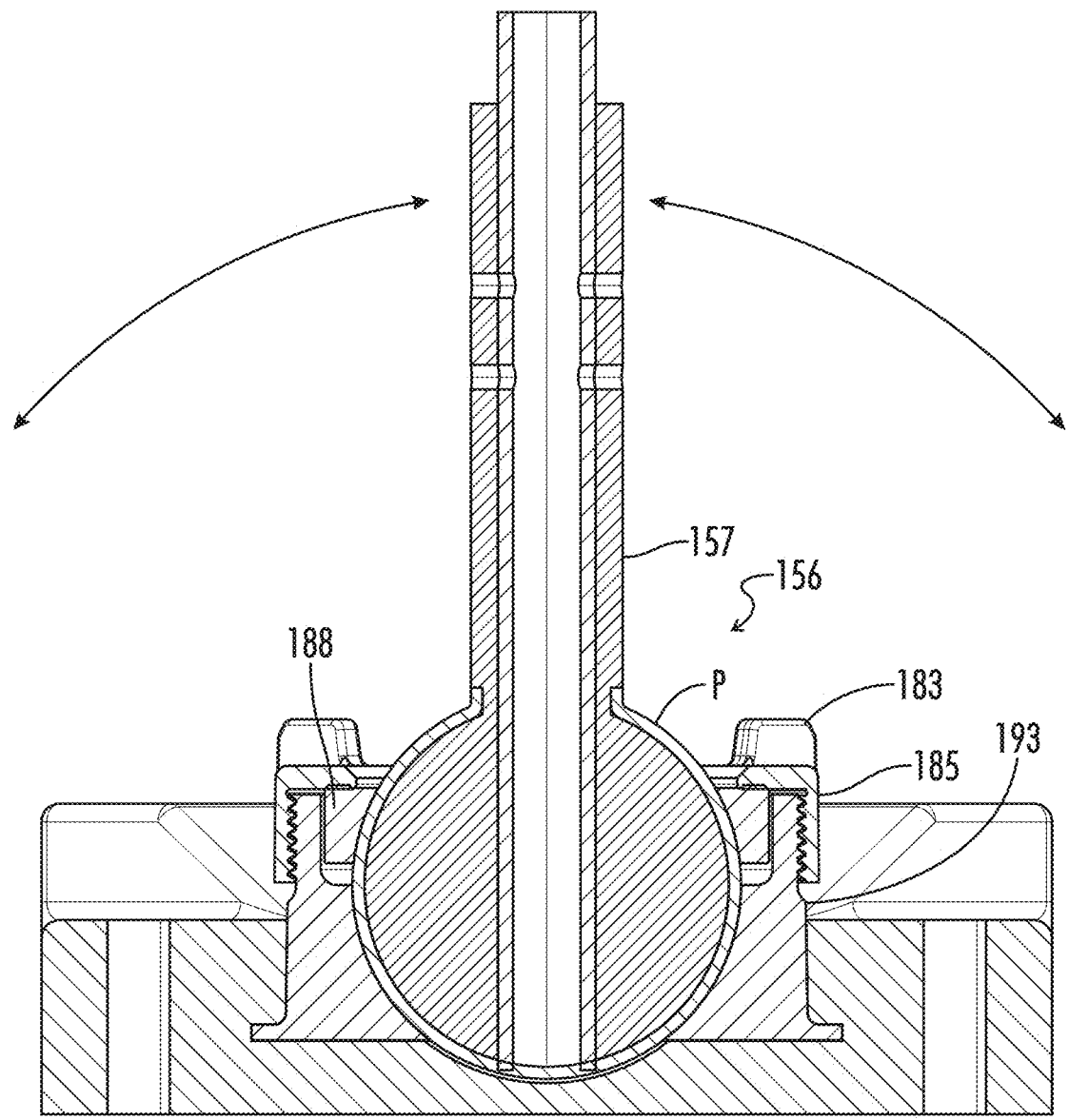
FIG. 14B is a sectional elevation view of the base in FIG. 14A taken along line A-A.
Figure 15:
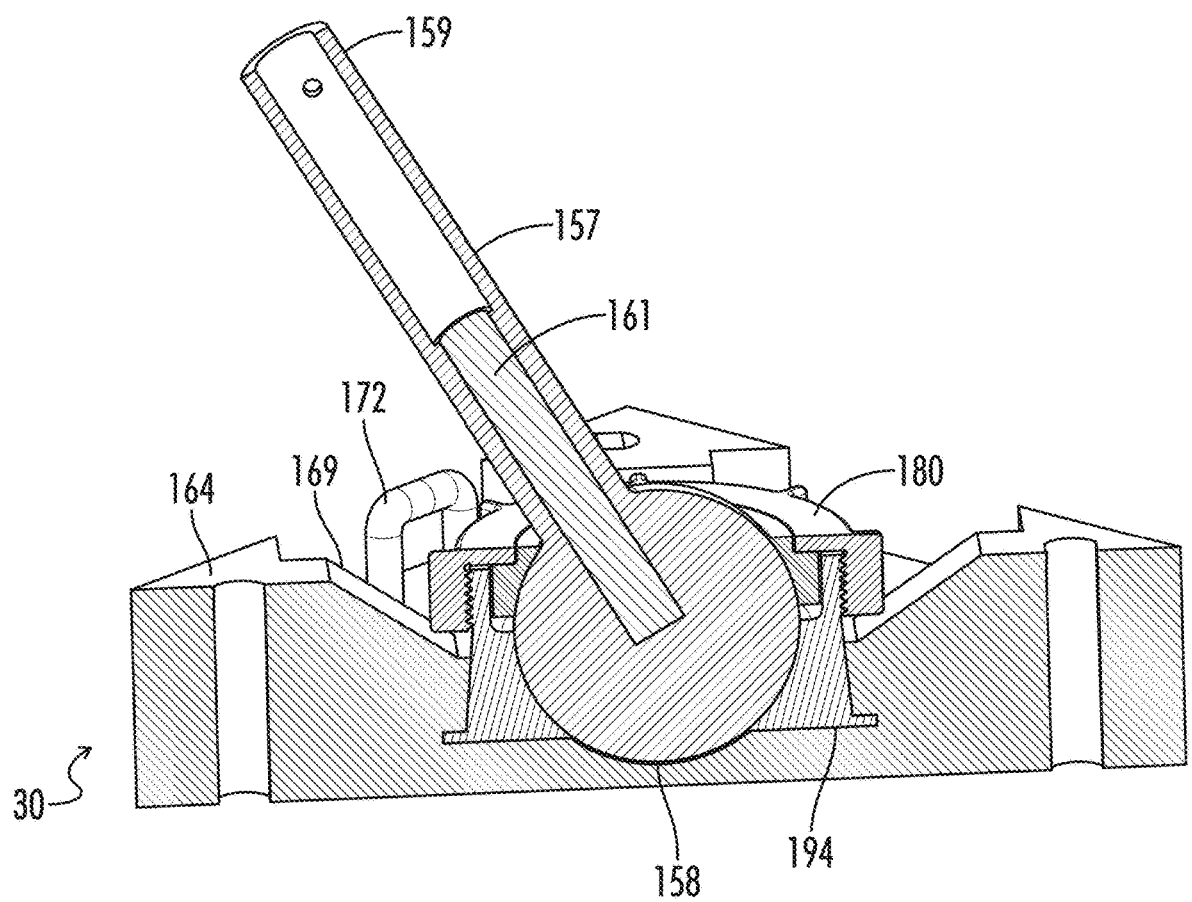
FIG. 15 is a sectional view of the base of FIGS. 12B, 13B with the ball joint providing an angled pole orientation.
Figure 16:
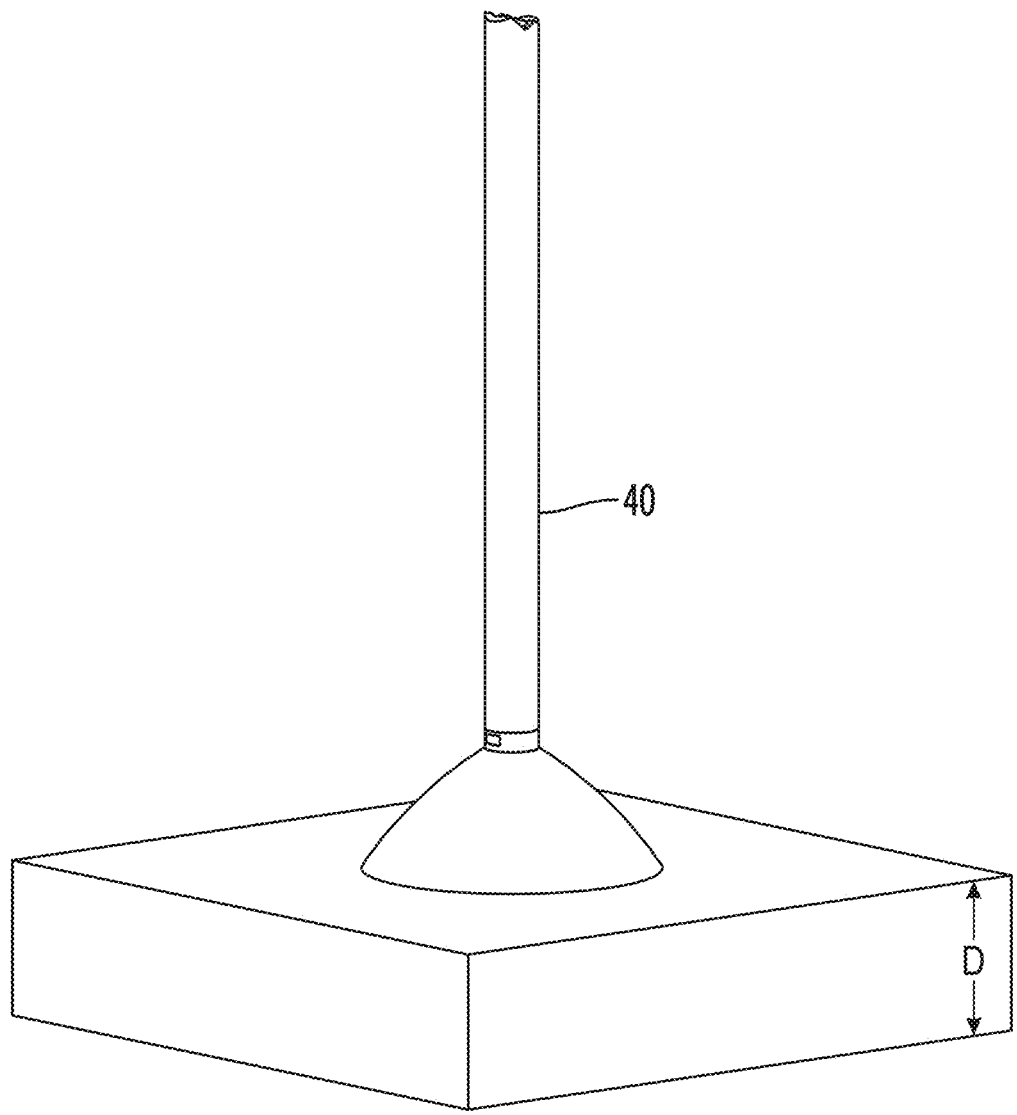
FIG. 16 is a perspective view of a section of concrete having a lower umbrella pole and assembled base anchored thereon.
Figure 17:
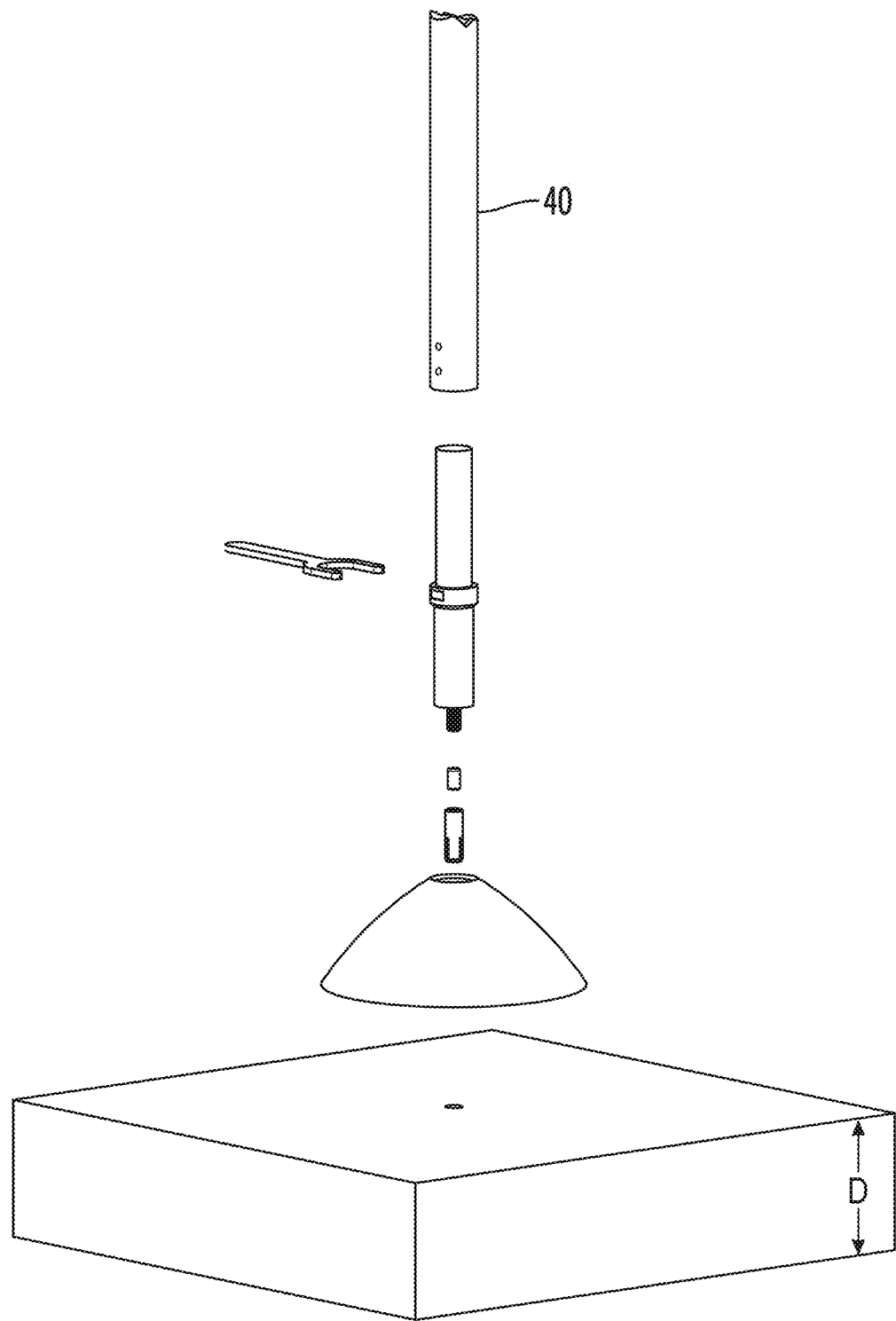
FIG. 17 is an exemplary exploded view of the lower pole and base of FIG. 16.
Figure 18:
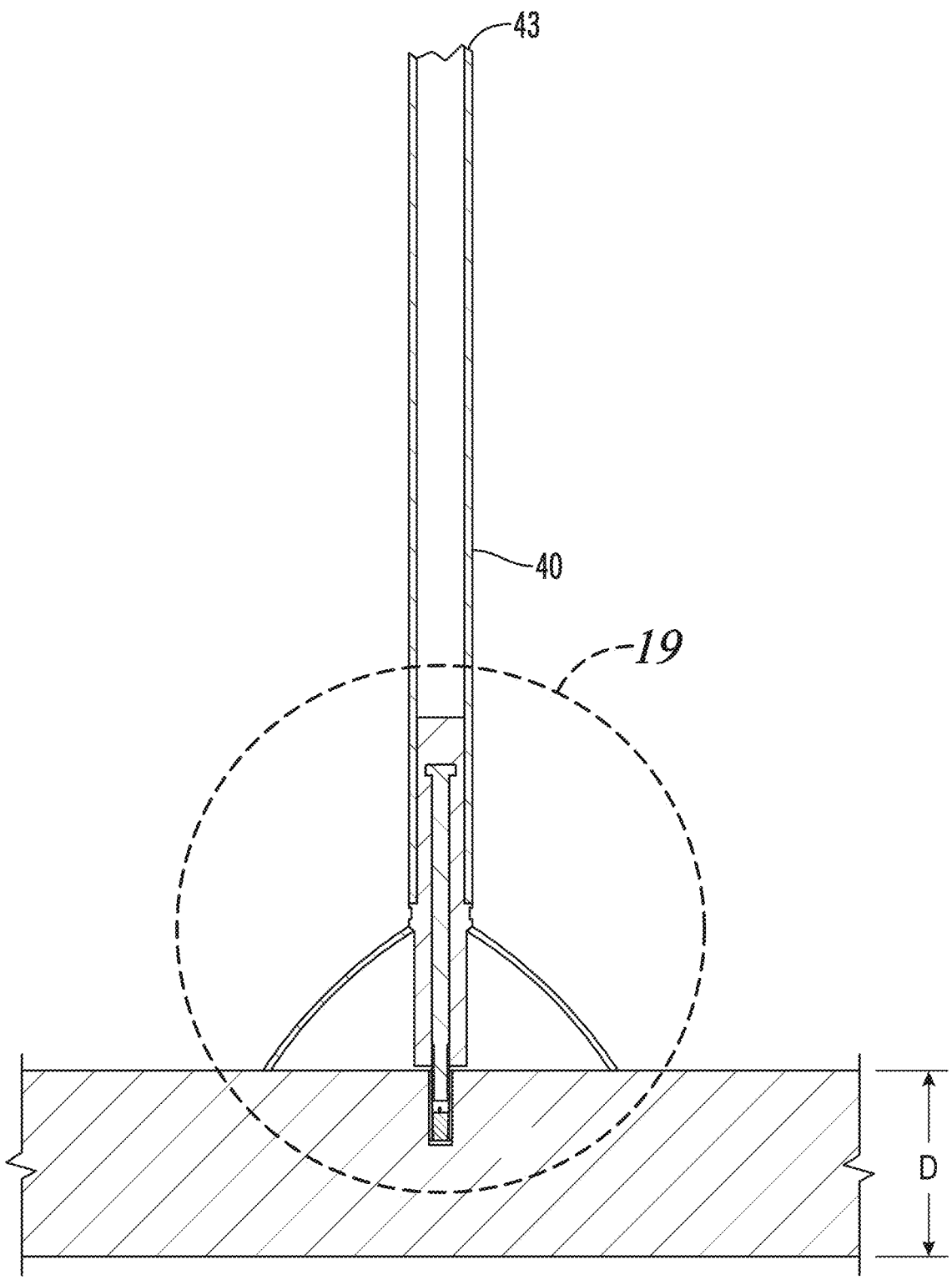
FIG. 18 is a sectional view of the lower pole and base of FIG. 16.
Figure 19:
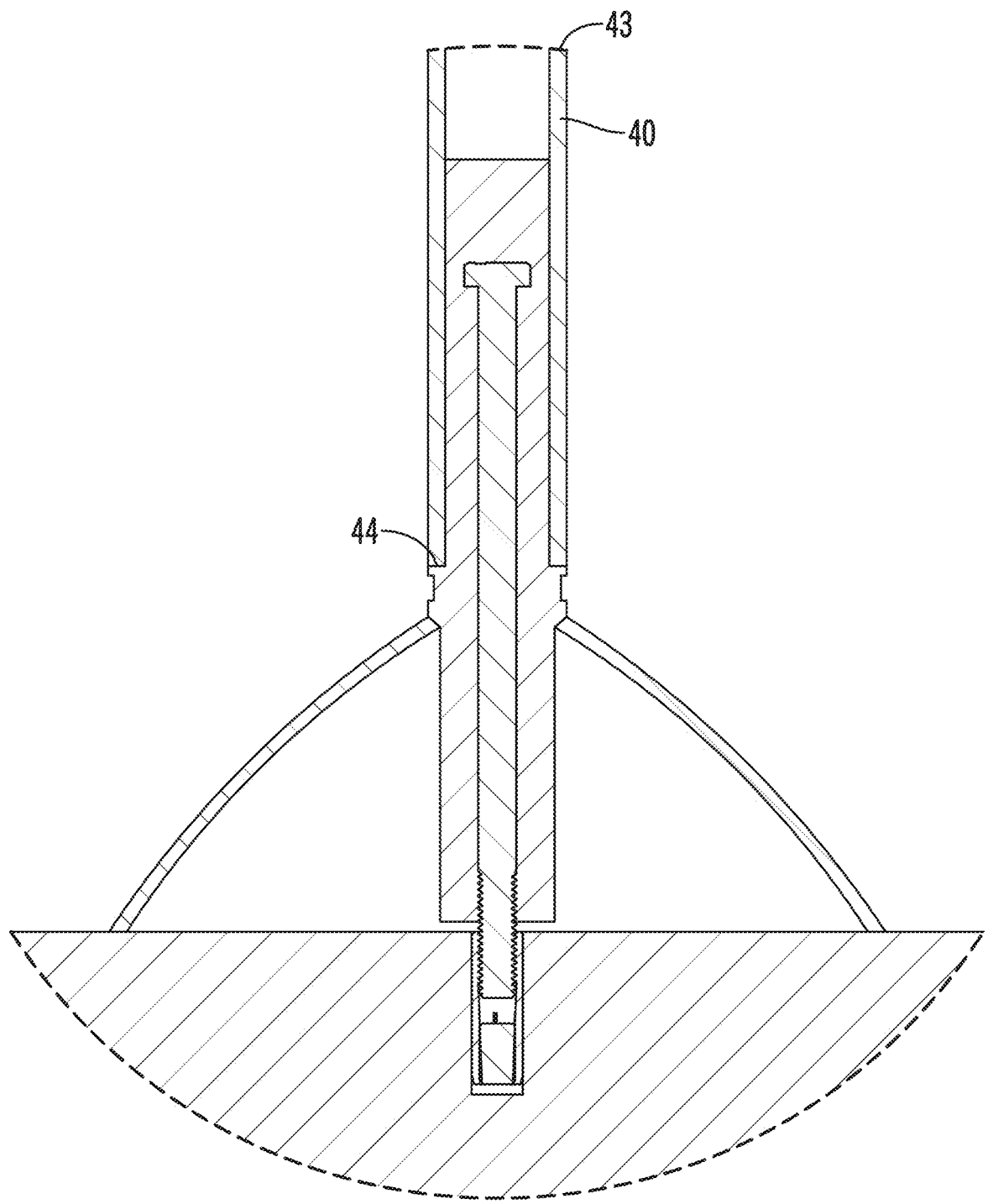
FIG. 19 is an enlarged view of the dashed circle portion of FIG. 18.

As shown in FIGS. 14A and 14B, the openings 168 through sleeves 166 are angled by varying degrees and in varying directions. It can be seen that the lumens 168 at raised corner blocks 164 at Positions A and C are angled approximately 10 degrees left of normal and 10 degrees right of normal, respectively. Similarly, the openings 168 at Positions B and D are angled 5 degrees left of normal and 5 degrees right of normal, respectively. The use of different angular orientations, both in magnitude and direction relative to normal, results in a most secure mounting when spikes are driven through openings 168 into a receptive mounting material. The preferred range of angle direction from vertical or normal is between about 4° and 15°, though with shorter spikes and when used on a dense mounting material, greater angular direction can be employed.

A second feature of the base 30 and FIGS. 12 through 15 is the inclusion of a base mounted ball-joint. The base 30 preferably has a closed bottom surface as depicted in FIGS. 12B, 13B with only openings 68 and 165 in the bottom surface. In a recessed central portion, a generally cup-shaped depression 162 is provided to receive the rounded bottom 158 of ball stud 156. Also received in the base 30 is ball sleeve 194 that may be attached or integrally molded into the base. To prevent rotation of ball sleeve 194, there is preferably an extending bottom flange 197 with channel 198 that interfits with detent 163 in the recessed area of base 30.

The interior of ball sleeve 194 includes a spherical segment 195 with a bottom opening 199 to the cup bottom 162. It can be seen in FIGS. 14B and 15, that the ball 158 fits into the spherical segment 195 and bottom cup 162 for rotational movement, until constrained. Ball sleeve 194 has an upper outer threaded portion 193 and an upper interior that receives top friction race 188 that in turn fits over a top portion of ball 158. Top friction race 188 has a top opening 189 through which stud 157 protrudes and an interior flange 191, as well as a slice of spherical surface 190 on the interior that permits frictional sliding relative to ball 158 until protruding stud 157 is constrained by the size of opening 189. Top friction race 188 is held in place by collar 180 with interior threads 182 allowing collar 180 to be fastened with ball sleeve 194. Collar 180 contains a central opening 181 through which stud 157 protrudes and which generally encircles the flange 191 of top friction race 188. Collar 180 also has an inward-facing top flange 184 and an exterior periphery 185 from which wings 183 protrude, so that the collar 180 can be easily rotated for threaded engagement with the ball sleeve 194. FIG. 14B shows that in construction, the ball stud 156 may be fabricated with a reinforcing pin 161 extending between the generally spherical ball portion 158 and the lumen 160 of longitudinal stud portion 157 to provide enhanced strength at the ball/stud junction.

It is also desirable that the friction surfaces of ball 158, on the one hand, and ball sleeve 194, top friction race 188, and even cup 162 of base 30, on the other hand, be of distinct materials. For instance, if all of these materials were made of aluminum, there would be an unacceptable likelihood of binding or seizure so that the ball joint would not provide functional movement. Metallic materials such as aluminum are suitable for use in the ball sleeve 194 and top friction race 188 provided the surface of ball 158 is of a different material and preferably a high durometer plastic coating P. It has been determined that a plastic coating with a durometer of approximately 95, generally between about 85 and 110 Shore A hardness rating, permits suitable positioning and movement of the stud 157 protruding through openings 189, 181 in the top friction race 188 and collar 180 of the ball joint mechanism. The size of the stud 157 and opening 189 in top friction race 188 preferably permit the stud 157 to be rotated in any direction from normal by at least 30 degrees and preferably to approximately 45 degrees. The preferred amount of angular deflection allowed to stud 157 within the opening of the collar or top friction race 188 is between 40 and 45 degrees from vertical. Generally, it is preferred that the stud 157 fit within a bottom opening in lower pole 40. This allows the use of a smaller diameter stud portion 157 and a larger diameter pole, which maximizes the overall strength of the umbrella assembly. Collar wings 183 are sized to extend more than one centimeter outward from the collar periphery 185 and to extend vertically for substantially the full height of the collar 180. This provides a surface that can be struck with a hammer or other suitable tool to provide additional rotational force to the collar and either secure an especially tight fit between the threaded sections of collar and ball sleeve or to loosen a previously-tightened collar. When tightened, the interior spherical surface segments of the top friction race 188 and the interior ball sleeve 194 are compressed on the surface of ball 158 with the resulting increased friction tending to make it more difficult to move the protruding stud 157. When an umbrella is positioned with its lower pole 40 on the stud 157, the collar is preferably tightened to a point where a force of about 60-75 Newtons acting on the pole 40 at a height of one meter above the base is required for movement of the ball stud 156.

FIG. 20 illustrates an optimized mounting spike for use with the sleeve openings 65, 168 of the base in FIGS. 10 through 15. The spike 210 has a distal driving point 211 to easily penetrate sand and to be driven into denser receptive surfaces such as compacted earth. A post portion 212 generally has a length of between 10 to 20 inches and at the neck may have a resilient grommet 213 to prevent the spike 210 from damaging the opening 168 through which it passes in the base 30. From the neck, the pin generally expands to a grasping portion 214 that may also define an opening and have a flattened proximal end 215 suitable for striking with a mallet or other tool to drive the spike 210 into a less than ideally receptive surface or mounting material.

The ball joint mechanism is advantageously provided at the bottom of a lower umbrella pole at the ultimate umbrella base. However, the ball joint may also be elevated from the ultimate base, so that for instance an umbrella base may be anchored and a pole extend upward for about 18-48" to table height, and a ball joint may be disposed at table height for connection to the canopy above. Such intermediate positioning may reduce the ultimate distance that the canopy can be displaced, but may nonetheless be desirable in furnished settings.

Figure 33A:
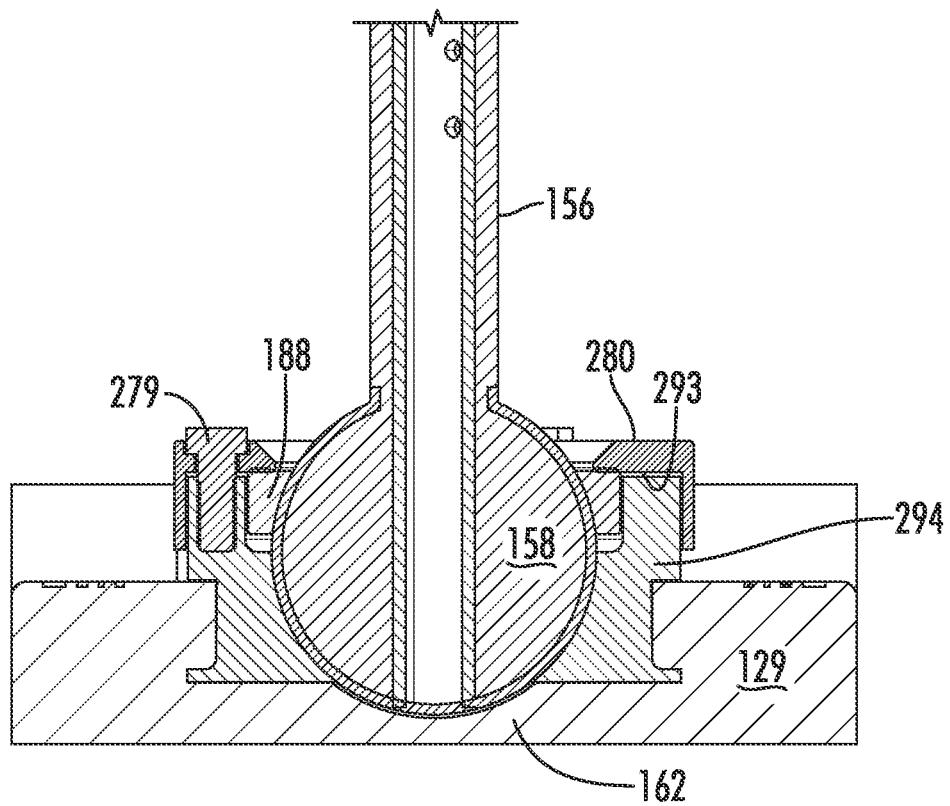
FIG. 33A is a sectional view of an alternative embodiment of a ball joint adjustment mechanism with a screw-fastened collar.
Figure 33B:
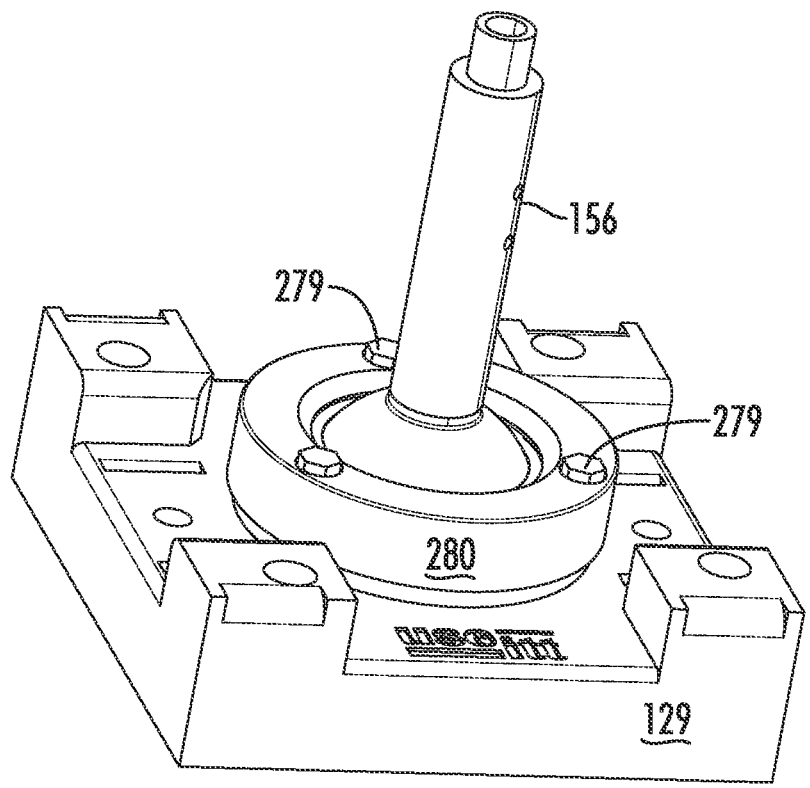
FIG. 33B is a top perspective view of the base of FIG. 33A.

FIGS. 33A and 33B illustrate an alternative ball joint mechanism where the ball sleeve 294 has been designed with a wide encircling edge 293 sufficient to allow the creation of threaded openings to receive screws 279. As with other designs, the ball 158 rests in the ball sleeve 294 and top race 188 is constrained by collar 280 against an upper portion of the ball 158. The sleeve cup bottom 162 has an opening that allows the bottom of ball to move freely with some spacing apart from the actual bottom 129 that is typically fabricated from plastic material. The ball sleeve 294 is advantageously fabricated from aluminum or other metal, but in the case of a relatively softer metal such as aluminum, the openings for receiving fastening screws 279 may be fitted with steel helicoils to reduce the chance of damage to the threads. The width of the flange 293 may be between about ⅜ to ½-inch depending upon the desired size of fastening screws 279. Generally, three or even four fastening screws may be utilized, and preferably these will be screws with hexagonal or allen wrench recessed openings in their heads which can be tightened to be nearly flush with the top surface of collar 280.

Figure 34A:
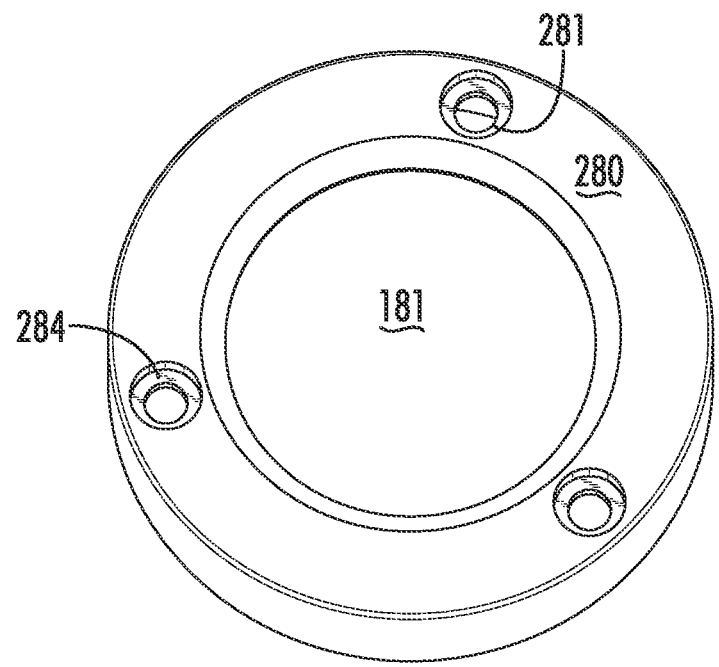
FIG. 34A is a top perspective view of a screw-fastened collar as shown in FIG. 33A.
Figure 34B:
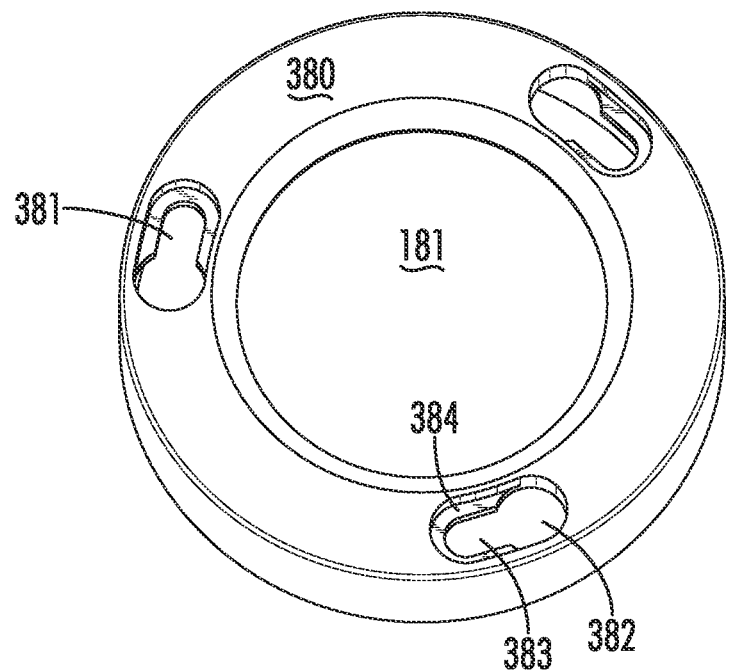
FIG. 34B is an alternative version of a screw-fastened collar adapted for quick release.

Collar 280 is shown in isolation in FIG. 34A with screw openings 281 surrounded by recessed interior flange 284 so that the threaded shaft of the screw passes through the opening 281 and the head of the screw rests upon the flange 284. An alternative collar 380 is shown in FIG. 34B that provides for quick attachment and release from a bottom structure 129 carrying a ball sleeve 294 or from a ball sleeve 294 that might be mounted in other ways. In use, the heads of screws 279 pass through the larger portion 382 of openings 381 and the collar is then rotated in a counter-clockwise fashion so that the screw heads are over the interior flanges 384 in the narrower portion 383 of screw opening slots 381. Screws 279 are then tightened and the collar constrains the top race 188 against an upper portion of ball 158.

The collar 380 may be quickly removed by simply loosening the screws 279 to the point where collar 380 can be rotated clockwise until the screw heads pass through larger portions 382 of opening slots 381 and the collar 380 is removed with the ball 158, ball stud 156, and any attached umbrella assembly. The collar and ball assembly may then be rapidly attached to other ball sleeves 294 that may be affixed in different ways. For instance, the ball sleeve 294 in FIGS. 33A and 33B is shown in plastic bottom 129 that may be spike mounted into sand or when appropriately configured strapped to a fixed base. However, without the plastic bottom 129, a ball sleeve 294 may be welded to a metal tabletop or a trailer hitch having a surface prepared with an d opening to accommodate space for the ball 158 in the position of the sleeve cup bottom. This makes the umbrella assembly quickly portable between different structures. In this fashion, the same umbrella may be utilized on a porch table with a welded ball sleeve and then quickly removed and attached to a base 129 for use as a lawn umbrella or a beach umbrella with appropriate ground or sand spike accessories.

FIGS. 16-19 disclose an anchor and dome base configuration that might be suitable with twist locks, or to secure the ultimate umbrella base of an intermediate ball joint adjustment mechanism.

Figure 30:
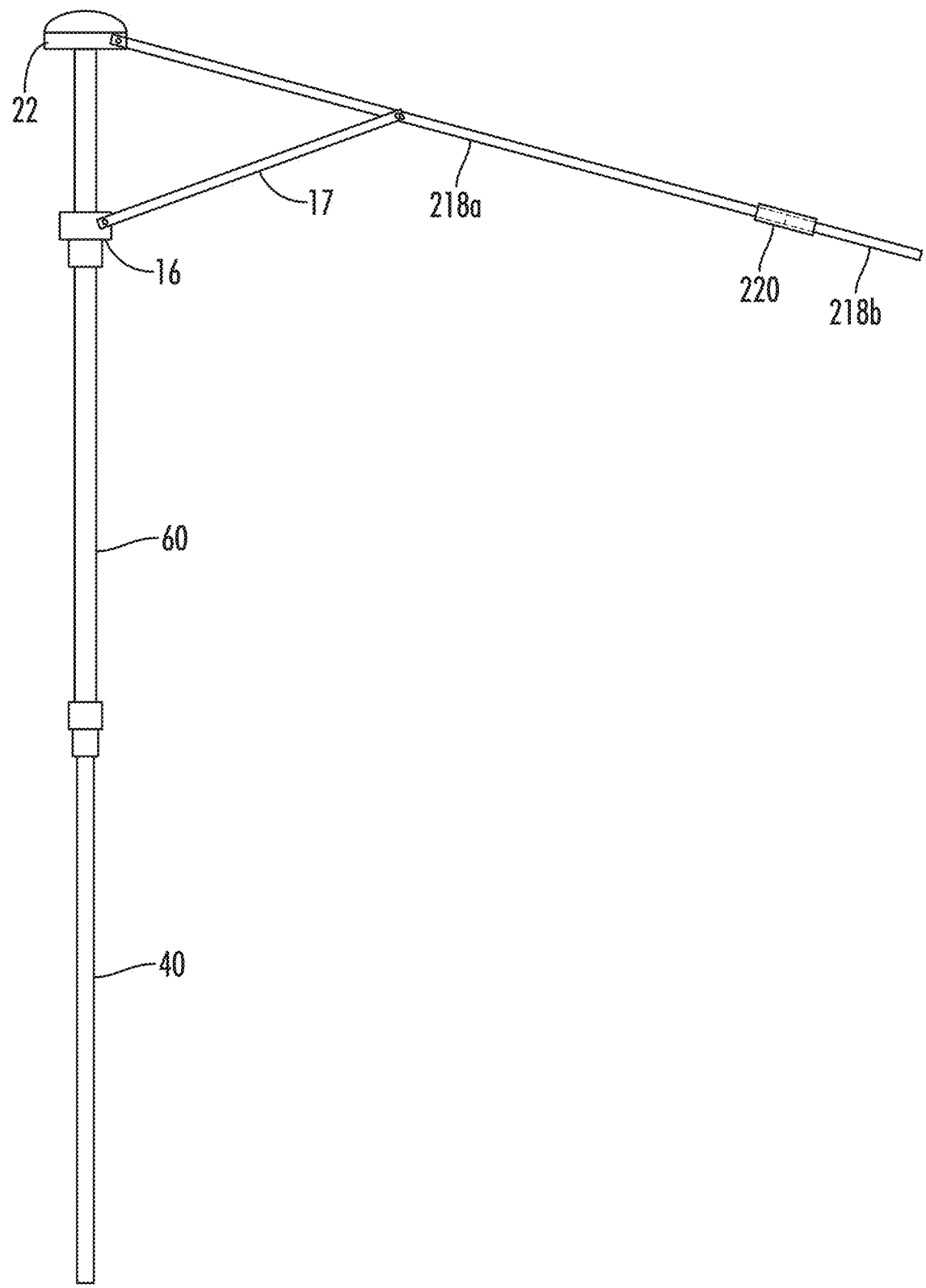
FIG. 30 is a diagram of an umbrella pole and canopy ribs and stretchers where the ribs are extensible.
Figure 31A:
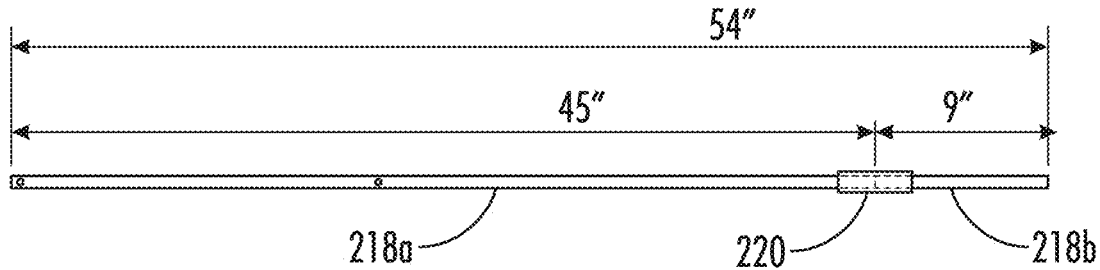
FIG. 31A illustrates an exemplary extensible rib in assembled form.
Figure 31B:
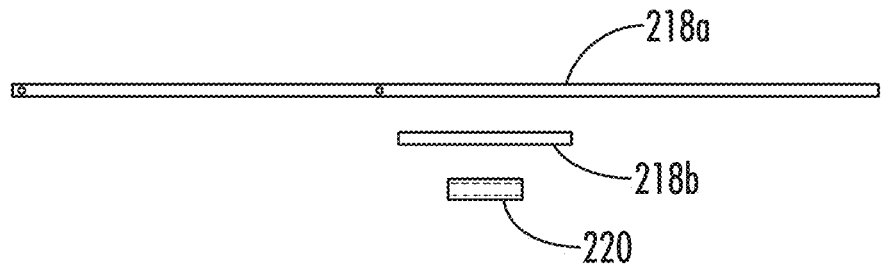
FIG. 31B illustrates the rib of FIG. 31A is unassembled components form.
Figure 31C:
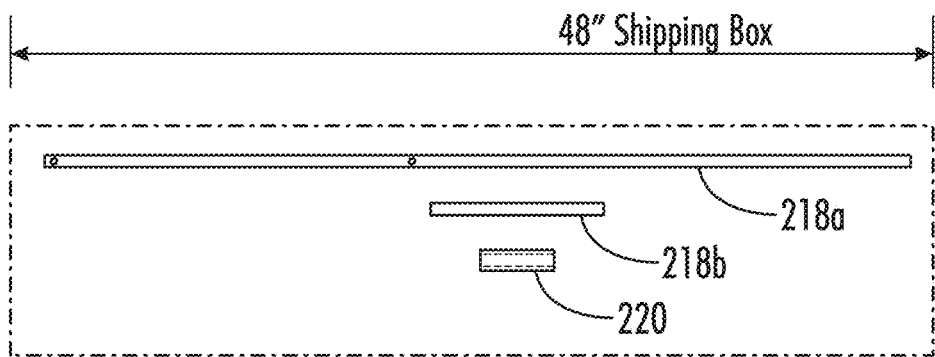
FIG. 31C reflects the packaging of the components of FIG. 31B.
Figure 32A:
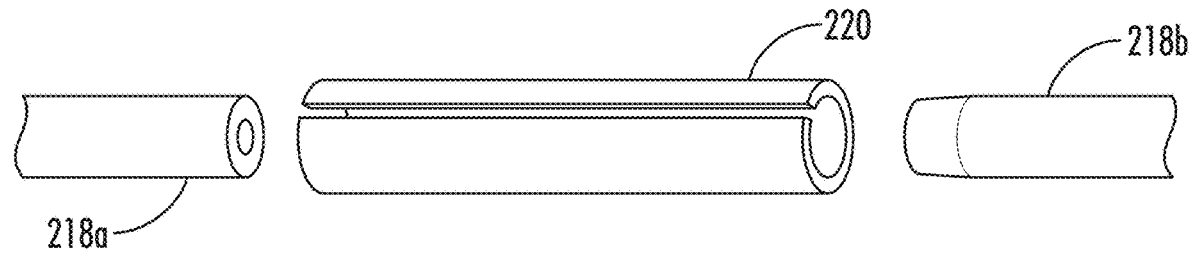
FIG. 32A depicts the joining of rib and rib extension in a sleeve joint.
Figure 32B:
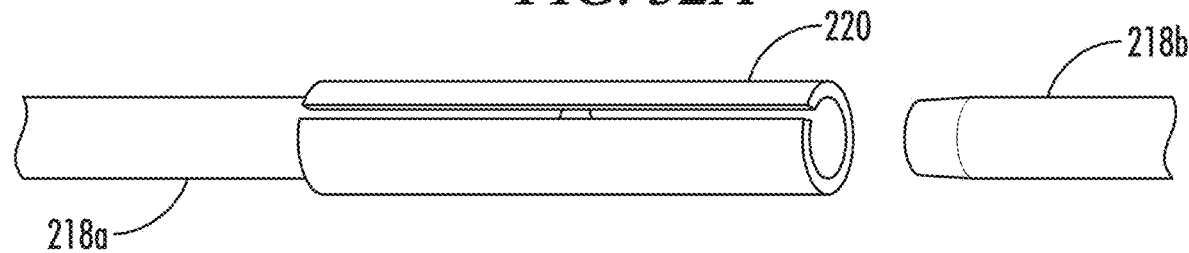
FIG. 32B depicts the mounting of the sleeve joint on an umbrella rib.
Figure 32C:
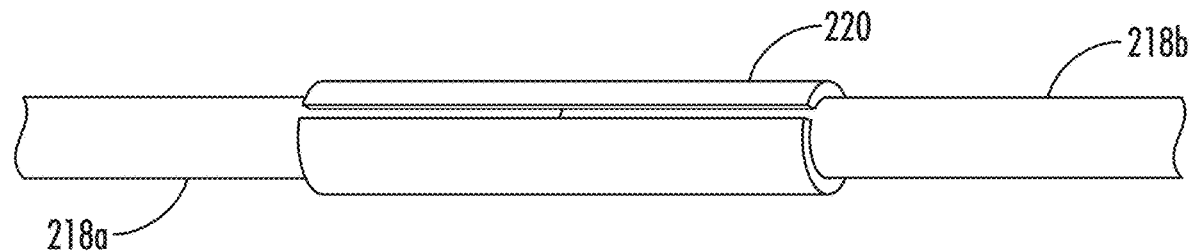
FIG. 32C depicts the completed assembly of an extensible umbrella rib.
Figure 32D:
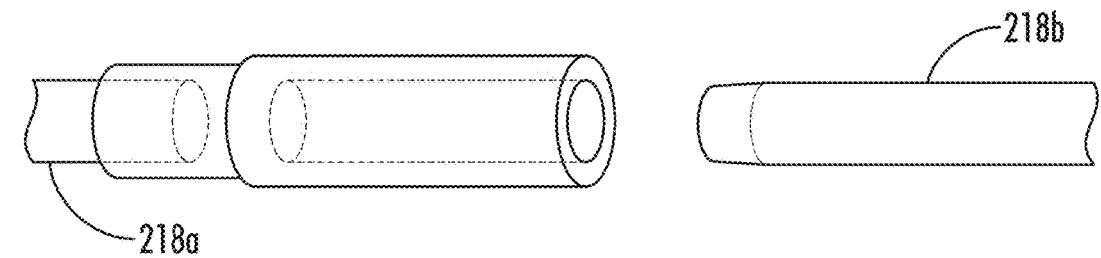
FIG. 32D depicts an alternative extensible rib configuration.

FIGS. 30-32 disclose the use of extensible ribs for an umbrella canopy. By fabricating canopy ribs in two parts 218a, 218b the overall length of an umbrella rib may reach 54", while having no single component longer than 45". This can provide support to a nine foot diameter umbrella canopy while being made of components that can be fit into a 48" long box. Because the shipping rates are optimal for packages up to 48" in length, but prohibitive for greater lengths, the use of extensible ribs allows for the shipment of umbrellas with nine foot canopies at nearly the same cost as umbrellas having only 7.5' canopies. Although some rib assembly to mount the parts 218a, 218b in a joining sleeve 220 is required, the differential in transportation cost is compelling justification. Indeed, as shown in FIG. 32B, some partial assembly may even be made at the factory before shipment so long as one rib part and the sleeve in combination do not exceed the 48" length metric. Preferably the ribs are slightly oval or elliptically shaped, with a raised ridge for alignment.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

I claim:
1. An umbrella comprising:
a canopy supported by a plurality of ribs;
an upper pole having an upper end carrying the canopy;
a lower pole having a lower end connected to a base, said upper pole and lower pole being concentric sliding members interfitting concentrically in a slidable fashion;
stretchers extending outward from the upper pole and supporting a plurality of ribs; and
a twist lock for engaging concentric sliding members;
wherein the twist lock comprises a mechanism on a first exterior member having:
a top cap threaded on the interior to receive a bottom cap threaded on the exterior and having a downward facing normal interior surface and downward facing inclined interior surface;
a base support received within the top cap having an upward facing normal surface below the downward facing inclined interior surface and upward facing inclined surface below the downward facing normal interior surface;
a lock ring biased to a normal position intermediate the upward and downward facing surfaces;
a longitudinally moveable post extendable through the upward facing normal surface; and
the bottom cap having an upward facing portion that restrains and pushes on a base of the post.

2. The umbrella of claim 1 wherein the first exterior member overfits a second interior member and the tightening of the top and bottom cap members on the first exterior member urges a lock ring held within the top cap into angled engagement with the second interior member, fixing its position relative to the first exterior member.

3. The umbrella of claim 2 wherein the base has a ball joint.

4. The umbrella of claim 2 wherein the base has a plurality of openings that receive spikes.

5. The umbrella of claim 2 wherein the base has an anchor.

6. The umbrella of claim 2 wherein the canopy has a width in excess of eight feet, and the plurality of ribs are extensible ribs formed of at least two longitudinal rib parts, each having a length of less than 45 inches, that are joined together to form a rib having a length in excess of 48 inches.

7. An umbrella comprising:
a canopy supported by a plurality of ribs;
an upper pole having an upper end carrying the canopy;
a lower pole having a lower end connected to a base, said upper pole and lower pole being first and second concentric sliding members interfitting concentrically in a slidable fashion;
stretchers extending outward from the upper pole and supporting a plurality of ribs; and
a twist lock for engaging concentric sliding members;
the lower end of the lower pole comprising a ball stud having a generally spherical end and a longitudinally protruding stud;
wherein the base has a ball sleeve with a spherical surface receiving the spherical end of the ball stud and
wherein the twist lock comprises a housing with an inner fitting split wedge collar associated with first concentric sliding member and a threaded shim with an interior angled surface positioned interior the housing and over the split wedge collar, said threaded shim being connected with second concentric sliding member.

8. The umbrella of claim 7 wherein the spherical end has a plastic surface with a Shore A durometer of between about 85 and 110.

9. The umbrella of claim 7 wherein a top friction race, with a segment of spherical inner surface and a central opening through which the protruding stud passes, is fastened to the ball sleeve so that the spherical end is constrained between the ball sleeve and friction race, and the size of the central opening and protruding stud are optimized to allow at least 30 degrees of angular movement by the protruding stud from the vertical toward the horizontal.

10. The umbrella of claim 7 wherein the ball sleeve has a threaded outer portion and a collar with inner threads and a central opening overfits the top friction race and fastens the friction race to the ball sleeve.

11. The umbrella of claim 7 wherein engaging and tightening the inner threads of the collar with the threaded outer portion of the ball sleeve applies a frictional grip to the spherical end of the ball stud so that the ball stud resists movement when a force of at least 60 newtons applied to the lower pole at a distance of one meter above the base.

12. The umbrella of claim 7 wherein the plurality of ribs are extensible ribs formed of at least two longitudinal rib parts.

13. The umbrella of claim 7 wherein the ball sleeve is fabricated from aluminum.

* * * * *